US012596219B2

(12) United States Patent
Ando et al.

(10) Patent No.: US 12,596,219 B2
(45) Date of Patent: Apr. 7, 2026

(54) OPTICAL MEMBER

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventors: Hiroshi Ando, Nisshin (JP); Kazuyuki Ishihara, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 411 days.

(21) Appl. No.: 18/190,237

(22) Filed: Mar. 27, 2023

(65) Prior Publication Data

US 2023/0341605 A1 Oct. 26, 2023

(30) Foreign Application Priority Data

Apr. 20, 2022 (JP) ................................. 2022-069607

(51) Int. Cl.
*F21V 8/00* (2006.01)
(52) U.S. Cl.
CPC ......... *G02B 6/0036* (2013.01); *G02B 6/0053* (2013.01); *G02B 6/0055* (2013.01)
(58) Field of Classification Search
None
See application file for complete search history.

(56) References Cited

U.S. PATENT DOCUMENTS

| | | | | |
|---|---|---|---|---|
| 5,617,398 A * | 4/1997 | Lee | ...................... | G11B 7/1356 |
| | | | | 369/112.28 |
| 5,719,649 A * | 2/1998 | Shono | .................. | G02B 6/0036 |
| | | | | 362/617 |
| 10,589,675 B1 * | 3/2020 | Huang | ................. | G02B 6/0046 |

(Continued)

FOREIGN PATENT DOCUMENTS

| | | | |
|---|---|---|---|
| CN | 211223231 U | * | 8/2020 |
| JP | 6172511 B2 | | 8/2017 |
| JP | 6372305 B2 | | 8/2018 |

OTHER PUBLICATIONS

U.S. Appl. No. 18/190,313, filed Mar. 27, 2023, Ishihara et al.

*Primary Examiner* — Ryan Crockett
(74) *Attorney, Agent, or Firm* — Posz Law Group, PLC

(57) ABSTRACT

An optical member includes a light guide body that includes an incident surface on which a light from a blind area is incident, multiple reflecting surfaces configured to reflect the light from the incident surface, a smooth surface configured to reflect the light reflected by the reflecting surfaces, and multiple prisms protruding from the reflecting surfaces in a normal direction of the reflecting surfaces and configured to emit the light from the incident surface and the light reflected by the smooth surface to an outside of the light guide body. The prisms are arranged at intervals in a first direction intersecting the normal direction and are arranged at intervals in a second direction intersecting the normal direction and the second direction. Each of the reflecting surfaces is positioned between the adjacent prisms such that reflecting surfaces are arranged at intervals in the first direction and the second direction.

7 Claims, 23 Drawing Sheets

(56) References Cited

U.S. PATENT DOCUMENTS

| | | | | |
|---|---|---|---|---|
| 2006/0238367 A1* | 10/2006 | Tsuchiya | .............. | G02B 6/0073 |
| | | | | 340/815.4 |
| 2008/0130316 A1* | 6/2008 | Kinoshita | ............ | G02B 6/0038 |
| | | | | 430/321 |
| 2008/0278659 A1* | 11/2008 | Park | .................... | G02B 6/0068 |
| | | | | 362/625 |
| 2012/0050149 A1* | 3/2012 | Ro | ....................... | G02B 6/0091 |
| | | | | 345/102 |
| 2012/0127397 A1* | 5/2012 | Yamamoto | ........... | G02B 6/0065 |
| | | | | 29/428 |
| 2023/0058463 A1* | 2/2023 | Ando | .................... | G02B 23/08 |

* cited by examiner

GAP BETWEEN
GUIDED LIGHTS

Ass 31 45 60

42 40

80 90

85

82

Ass i

OPTICAL MEMBER

CROSS REFERENCE TO RELATED APPLICATION

The present application claims the benefit of priority from Japanese Patent Application No. 2022-069607 filed on Apr. 20, 2022. The entire disclosure of the above application is incorporated herein by reference.

TECHNICAL FIELD

The present disclosure relates to an optical member.

BACKGROUND

Conventionally, there has been known a blind area assisting device that includes a semi-transmissive mirror, a mirror, a translucent member, and a prism.

SUMMARY

The present disclosure provides an optical member that includes a light guide body including multiple reflecting surfaces. The reflecting surfaces are arranged at intervals in a first direction that intersects a normal direction of the reflecting surfaces and are arranged at intervals in a second direction that intersects the normal direction and the first direction.

BRIEF DESCRIPTION OF DRAWINGS

Objects, features and advantages of the present disclosure will become apparent from the following detailed description made with reference to the accompanying drawings. In the drawings:

FIG. 3 is a diagram showing the optical member viewed in a direction indicated by an arrow III in FIG. 2;

FIG. 5 is a schematic cross-sectional view showing a state in which an outside light is incident on an incident surface of the optical member according to the first embodiment;

FIG. 8 is a schematic diagram of an optical member according to a comparative example;

FIG. 9 is a schematic diagram of an optical member according to another comparative example;

FIG. 10 is a cross-sectional view of an optical member according to a second embodiment;

FIG. 11 is a diagram of the optical member viewed in a direction indicated by an arrow XI in FIG. 10;

FIG. 12 is a cross-sectional view of an optical member according to a third embodiment;

FIG. 14 is a cross-sectional view of an optical member according to a fourth embodiment;

FIG. 21 is a schematic cross-sectional view showing a state in which an outside light is incident on an incident diffraction grating in the optical member;

DETAILED DESCRIPTION

Figure 1:
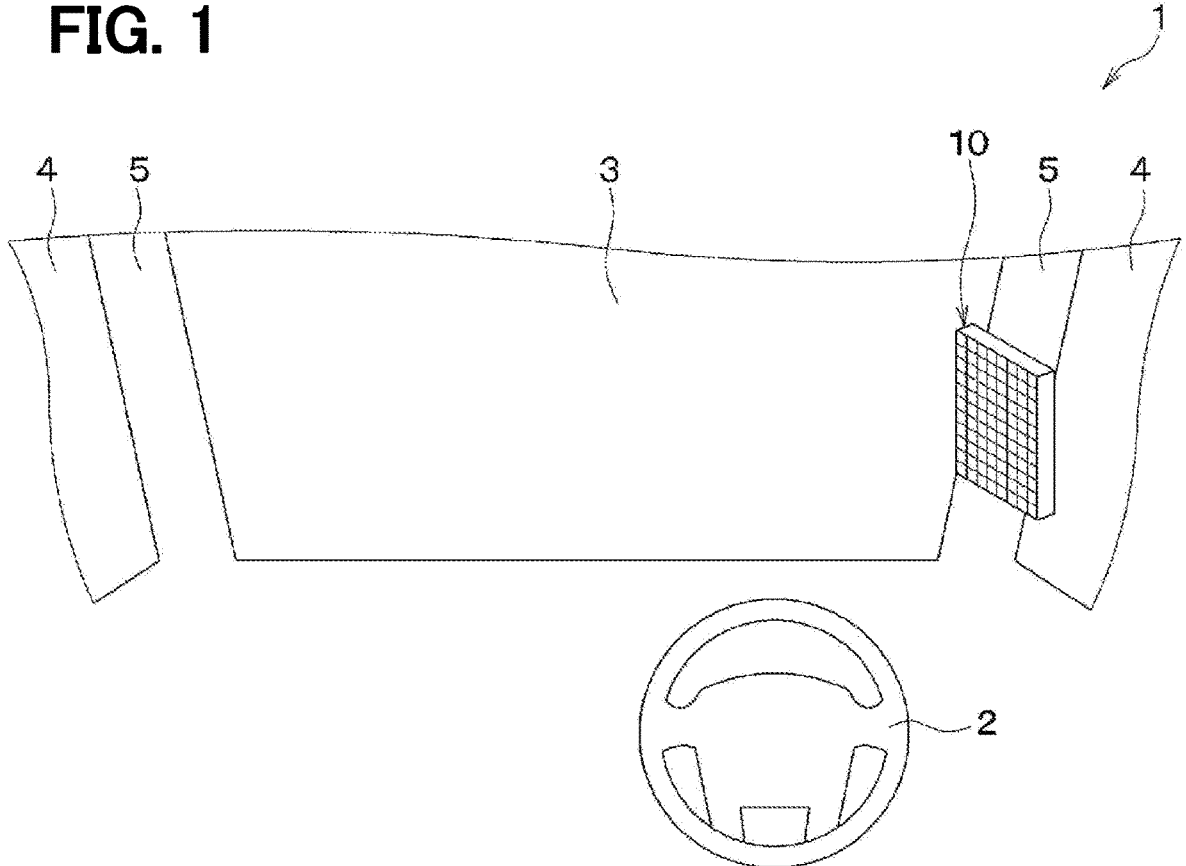
FIG. 1 is a diagram showing a configuration of a vehicle that adopts an optical member according to a first embodiment.

Next, a relevant technology is described only for understanding the following embodiments. A blind area assisting device according to a relevant technology includes a semi-transmissive mirror, a mirror, a translucent member, and prisms. The semi-transmissive mirror is disposed toward a viewer. The mirror reflects light to the semi-transmissive mirror. The translucent member is disposed between the semi-transmissive mirror and the mirror. The prisms are disposed between the semi-transmissive mirror and the viewer. The prisms each extends in a vertical direction and are arranged in a horizontal direction. Each of the prisms has a light shielding layer on a surface that does not face an incident surface on which a light from the translucent member is incident. The light shielding layers block light incident from a viewer side.

According to studies by the inventors, in the blind area assisting device described above, since the prisms each extends in the vertical direction and are arranged in the horizontal direction, the light shielding layers also each extends in the vertical direction and are arranged in the horizontal direction. Thus, in a case where the light shielding layers are made of, for example, black resin, and when a viewer looks at the blind area assisting device, the light shielding layers look like black stripes each extending in the vertical direction and arranged in the horizontal direction.

When a viewer looks at a scene, since the viewer's eyes are on the left and right, if there are periodic stripes in the vertical direction at a distance different from the scene, a visual processing of the viewer will fuse the scene with the strips. Thus, a visual attraction, which indicates the ease of recognizing the stripes by the viewer, increases, and the fusion of the scene between the left and right eyes is hindered. Furthermore, since moire generated by the vertical stripes of periodic structure moves due to a horizontal movement of both eyes of the viewer, the visual attraction increases. Therefore, recognition of the scene in a blind area reflected in the blind area assisting device is lowered, and the visibility of the scene in the blind area is lowered.

Furthermore, since the blind area assisting device described above includes the semi-transmissive mirror that has a dielectric multilayer and the like, the number of components of the blind area assisting device increases. Therefore, it is desired to provide a blind area viability assisting device without a semi-transmissive mirror in order to reduce the cost of the blind area assisting device.

It is conceivable to reflect light on a reflecting surfaces of a light guide body formed between the prisms instead of the semi-transmissive mirror in order to provide a blind area assisting device without a semi-transmissive mirror. However, in this case, since the prisms each extends in the vertical direction and are arranged in the horizontal direction, the reflecting surfaces also each extends in the vertical direction and are arranged in the horizontal direction. At this time, the reflecting surfaces looks like stripes each extending in the vertical direction and arranged in the horizontal direction. Therefore, due to the reflecting surfaces, the visual attraction, which indicates the ease of recognizing the stripes, increases in the same manner as described above. Accordingly, recognition of the scene in the blind area reflected in the blind area assisting device is lowered, so that the visibility of the scene in the blind area is lowered.

An optical member according to a first aspect of the present disclosure includes a light guide body. The light guide body includes an incident surface on which a light from a blind area is incident, multiple reflecting surfaces configured to reflect the light that is guided from the incident surface, a smooth surface configured to reflect the light that is reflected by the reflecting surfaces, and multiple prisms protruding from the reflecting surfaces in a normal direction of the reflecting surfaces and configured to emit the light that is guided from the incident surface and the light that is reflected by the smooth surface to an outside of the light guide body. The prisms are arranged at intervals in a first direction that intersects the normal direction and are arranged at intervals in a second direction that intersects the normal direction and the second direction. Each of the reflecting surfaces is positioned between two of the prisms adjacent to each other such that the reflecting surfaces are arranged at intervals in the first direction and the second direction.

An optical member according to a second aspect of the present disclosure includes a light guide body. The light guide body includes an incident portion configured to diffract a light that is incident from a blind area, multiple reflecting surfaces configured to reflect the light that is diffracted by the incident portion, a smooth surface configured to reflect the light that is reflected by the reflecting surfaces, and multiple exit portions disposed on the reflecting surfaces and configured to diffract the light that is diffracted by the incident portion and the light that is reflected by the smooth surface to emit the lights to an outside of the light guide body. The exit portions are arranged at intervals in a first direction that intersects a normal direction of the reflecting surfaces and are arranged at intervals in a second direction that intersects the normal direction and the first direction. Each of the reflecting surfaces is positioned between two of the exit portions adjacent to each other such that the reflecting surfaces are arranged at intervals in the first direction and the second direction.

An optical member according to a third aspect of the present disclosure includes a light guide body. The light guide body includes a first hologram configured to interfere and refract a light that is incident from a blind area, multiple reflecting surfaces configured to reflect the light that is refracted by the first hologram, a smooth surface configured to reflect the light that is reflected by the reflecting surfaces, multiple second holograms disposed on the reflecting surfaces and configured to interfere and refract the light that is refracted by the first hologram and the light that is reflected by the smooth surface to emit the lights to an outside of the light guide body. The second holograms are arranged at intervals in a first direction that intersects a normal direction of the reflecting surfaces and are arranged at intervals in a second direction that intersects the normal direction and the first direction. Each of the reflecting surfaces is positioned between two of the second holograms adjacent to each other such that the reflecting surfaces are arranged at intervals in the first direction and the second direction.

According to the first to third aspects, when the total area of the reflecting surfaces when viewed in the normal direction is constant, the length of the reflecting surfaces in the second direction, for example, a vertical direction can be decreased by increasing the length of the reflecting surfaces in the first direction, for example, a horizontal direction. Accordingly, recognition of stripes by the reflecting surfaces can be restricted, so that the visual attraction is lowered. Therefore, deterioration in recognition of the scene in the blind area reflected on the optical member can be restricted.

Hereinafter, embodiments will be described with reference to the drawings. In the following embodiments, the same or equivalent portions are denoted by the same reference numerals, and the description thereof will be omitted.

First Embodiment

An optical member 10 according to a first embodiment of the present disclosure can be adopted, for example in a vehicle 1. As shown in FIG. 1, the vehicle 1 includes a steering wheel 2, a front window 3, side windows 4, pillars 5, and the optical member 10. The optical member 10 is attached to, for example, the pillar 5, and guides an outside light Lo from a blind area due to the pillar 5 to an occupant of the vehicle 1, so that a scene in the blind area is visually recognized by the occupant of the vehicle 1. Note that the occupant of the vehicle 1 corresponds to a viewer.

Figure 2:
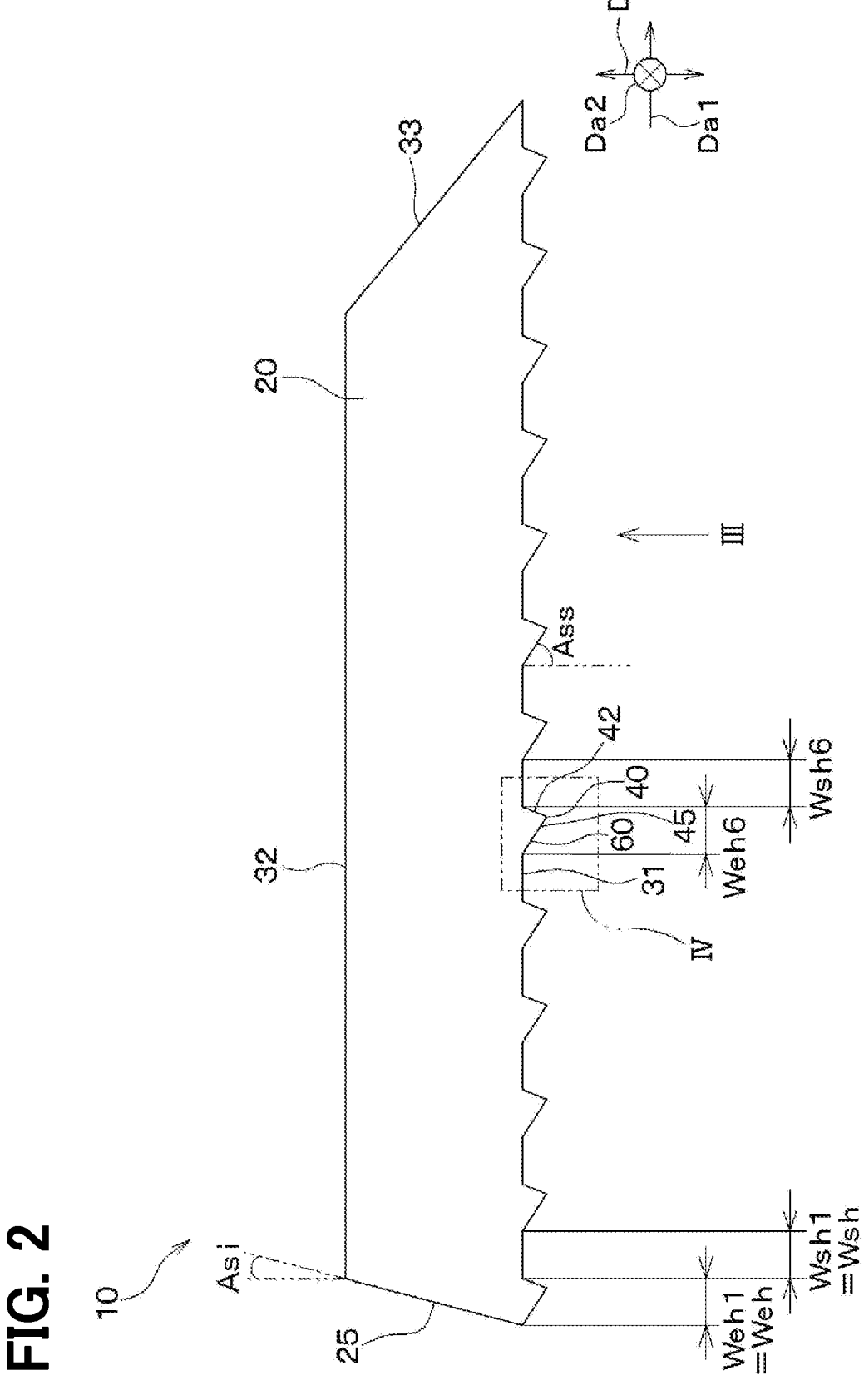
FIG. 2 is a cross-sectional view of the optical member.
Figure 3:
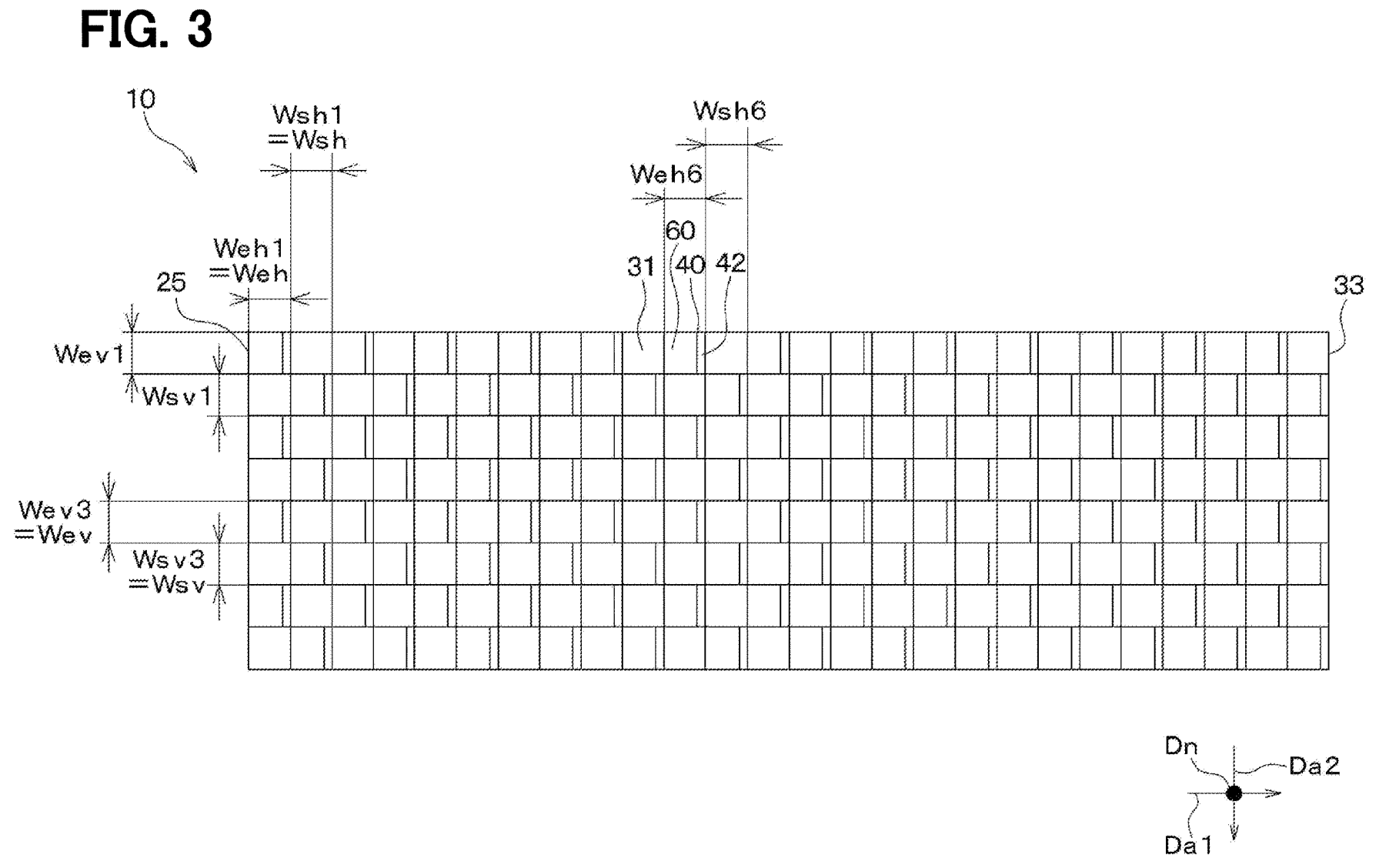
Figure 4:
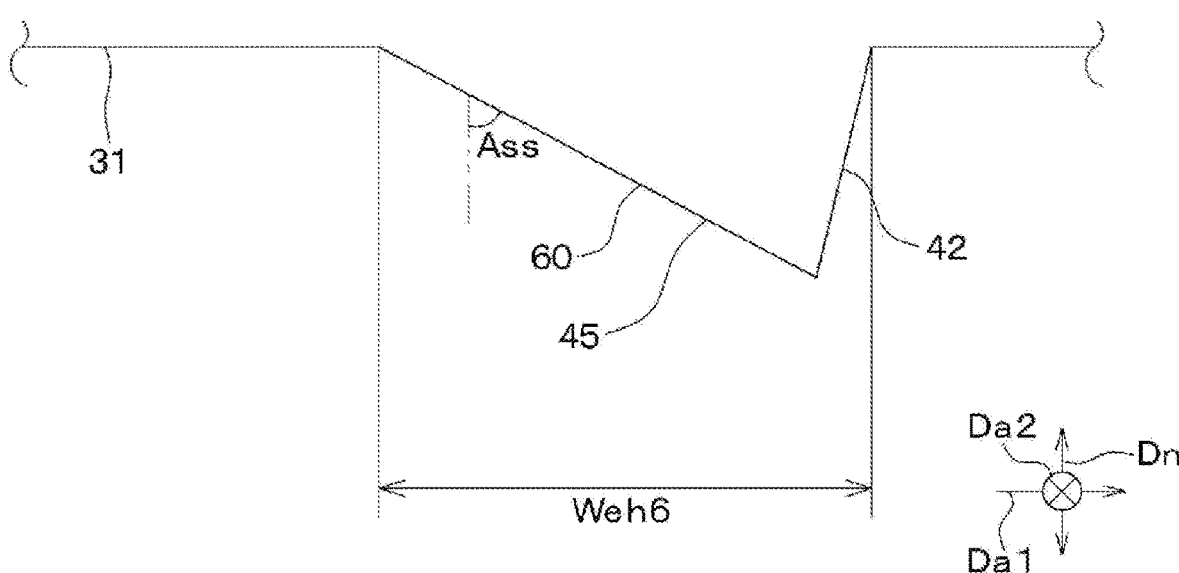
FIG. 4 is an enlarged view of a portion IV in FIG. 2.

Specifically, the optical member 10 includes a light guide body 20 and light shielding layers 60, as shown in FIGS. 2 to 4. In cross-sectional views in FIG. 2 and the drawings described later, a cross-sectional hatching of the optical member 10 is omitted for easy understanding.

The light guide body 20 is made of a translucent material such as resin material or glass. Examples of the resin material includes polyethylene terephthalate, polycarbonate, polyethylene, acrylic, and the like. The light guide body 20 includes an incident surface 25, multiple reflecting surfaces 31, a smooth surface 32, a connecting surface 33 and multiple prisms 40.

The incident surface 25 is a surface on which the outside light Lo is incident. The reflecting surfaces 31 are disposed to face the occupant of the vehicle 1 and intersect the incident surface 25. The reflecting surfaces 31 reflect the light from the incident surface 25. The smooth surface 32 is connected with the incident surface 25 on a side opposite to the reflecting surfaces 31 and is parallel to the reflecting surfaces 31. The smooth surface 32 reflects the light reflected by the reflecting surfaces 31. The connecting surface 33 is located opposite to the incident surface 25 and is connected with the reflecting surfaces 31 and smooth surface 32 while intersecting each other.

Here, a direction of a normal line passing through the reflecting surface 31 is defined as a normal direction Dn. As shown in FIG. 2, the incident surface 25 is inclined with respect to the normal direction Dn. An incident surface angle Asi, which is an inclination angle of the incident surface 25 with respect to the normal direction Dn, is an acute angle. A refractive index of the light guide body 20 is denoted as n1. A refractive index of an external medium of the light guide body 20 is denoted as n2. An incident angle when the light from the incident surface 25 is reflected by the reflecting surface 31 and an incident angle when the light reflected by the reflecting surface 31 is reflected by the smooth surface 32 is denoted as θi. The light guide body 20 is configured so as to satisfy the following relational expression (1-1).

$$\sin\theta i \geqq \frac{n2}{n1} \qquad (1\text{-}1)$$

As a result, even if the light guide body 20 does not have a mirror, the light from the incident surface 25 is totally reflected by the reflecting surface 31 and the smooth surface 32 and is efficiently guided.

The prisms 40 are formed, for example, by molding, cutting, blasting, or a combination thereof when the light guide body 20 is formed. Each of the prisms 40 protrudes from the reflecting surface 31 and has a triangular prism shape. As shown in FIG. 3, the prisms 40 are arranged at intervals in a first direction Da1 orthogonal to the normal direction Dn. Furthermore, the prisms 40 are arranged at intervals in a second direction Da2 orthogonal to the normal direction Dn and the first direction Da1. Accordingly, multiple reflecting surfaces 31 are arranged at intervals in the first direction Da1 and are arranged at intervals in the second direction Da2. Thus, the prisms 40 and the reflecting surfaces 31 are arranged two-dimensionally. Furthermore, the prisms 40 and the reflecting surfaces 31 are alternately arranged in the first direction Da1 and the second direction Da2. Each of the prisms 40 includes a prism exit surface 42 and a prism light-shielding surface 45.

The prism exit surface 42 is connected with the adjacent reflecting surface 31. The prism exit surface 42 is parallel to the incident surface 25. Thus, the prism exit surface 42 is inclined at the incident surface angle Asi with respect to the normal direction Dn. As a result, an incident angle of the light inside the light guide body 20 reaching the prism exit surface 42 is less likely to be a total reflection angle with respect to the prism exit surface 42. Therefore, even if the light guide body 20 does not have a semi-transmissive mirror, the light inside the light guide body 20 reaching the prism exit surface 42 is more likely to exit from the prism exit surface 42.

The prism light-shielding surface 45 is connected with the prism exit surface 42 while intersecting each other. The prism light-shielding surface 45 is inclined at a shielding surface angle Ass with respect to the normal direction Dn.

The light shielding layers 60 are light absorbing films that absorb 99% or more of light. The light shielding layers 60 are formed of, for example, black resin by coating, printing, vapor deposition, or the like. The light shielding layers 60 cover the entire surface of the respective prism light-shielding surfaces 45, as shown in FIG. 4. The light shielding layers 60 block light incident from the occupant side of the vehicle 1 toward the prism light-shielding surfaces 45. Although the light shielding layers 60 in this example are made of black resin, the material of the light shielding layers 60 is not limited to black resin. For example, the light shielding layers 60 may be made of metal.

As shown in FIGS. 2 to 4, an average length of the prisms 40 in the first direction Da1 is denoted as a prism width Weh. An average length of the reflecting surfaces 31 in the first direction Da1 is denoted as a reflection width Wsh. An average length of the prisms 40 in the second direction Da2 is denoted as a prism height Wev. An average length of the reflecting surfaces 31 in the second direction Da2 is denoted as a reflection height Wsv. In addition, i, j, m, and r are natural numbers. A prism width Weh that is an i-th when counted from a side close to the incident surface 25 in the first direction Da1 is denoted as an i-th prism width Wehi. A reflection width Wsh that is a j-th when counted from the side close to the incident surface 25 in the first direction Da1 is denoted as a j-th reflection width Wshj. A prism height Wev that is an m-th in a direction from an end of the light guide body 20 toward the second direction Da2 is denoted as an m-th prism height Wehi. A reflection height Wsv that is an r-th in the direction from the end of the light guide body 20 toward the second direction Da2 is denoted as an r-th reflection height Wsvr.

When one prism 40 and one reflecting surface 31 adjacent to the one prism 40 in the first direction Da1 are regarded as one set, the number of sets of the prism 40 and the reflecting surface 31 in the first direction Da1 is denoted as p. When one prism 40 and one reflecting surface 31 adjacent to the one prism 40 in the second direction Da2 are regarded as one set, the number of sets of the prism 40 and the reflecting surface 31 in the second direction Da2 is denoted as q. The number of prisms 40 in the first direction Da1 is noted as kh. The number of prisms 40 in the second direction Da2 is noted as kv. The number of prisms 40 arranged in a region defined by the sum of the prism width Weh and the reflection width Wsh and the sum of the prism height Wev and the reflection height Wsv is denoted as a common coefficient Cn. In this example, p is 13, for example, and q is 4, for example. The number of reflecting surfaces 31 in the first direction Da1 is the same as the number of the prisms 40 in the first direction Da1, is kh, and is 13, for example. Furthermore, the number of reflecting surfaces 31 in the second direction Da2 is the same as the number of prisms 40 in the second direction Da2, is kv, and is 4, for example. The common coefficient Cn is 2, for example.

When viewed in the normal direction Dn, the sum of areas of the prisms 40 is denoted as a prism total area E. An area obtained by adding the sum of areas of the reflecting surfaces 31 viewed in the normal direction Dn to the prism total area E is denoted as a total area S. A ratio of the sum of the areas of the reflecting surfaces 31 viewed in the normal direction to the total area S is denoted as a reflection area ratio Rw.

The prism width Weh, the reflection width Wsh, the prism height Wev, the reflection height Wsv, the i-th prism width Wehi, the j-th reflection width Wshj, the m-th prism height Wevm, and the r-th reflection height Wsvr are set to 0.1 mm or more. Since the i-th prism width Wehi has a length within a predetermined range, the prism width Weh is expressed by the following relational expression (1-2) using the i-th prism width Wehi and kh.

$$Weh = \frac{\sum_{i=1}^{kh} Wehi}{kh} \qquad (1\text{-}2)$$

For example, the first prism width Weh1 is the same as the prism width Weh. Since the j-th reflection width Wshj has a length within a predetermined range, the reflection width Wsh is expressed by the following relational expression (1-3) using the j-th reflection width Wshj and kh.

$$Wsh = \frac{\sum_{j=1}^{kh} Wshj}{kh} \tag{1-3}$$

For example, the first reflection width Wsh1 is the same as the reflection width Wsh. Since the m-th prism height Wevm is a length within a predetermined range, the prism height Wev is expressed by the following relational expression (1-4) using the m-th prism height Wevm and kv.

$$Wev = \frac{\sum_{m=1}^{kv} Wevm}{kv} \tag{1-4}$$

For example, the third prism height Wev3 is the same as the prism height Wev. Since the r-th reflection height Wsvr has a length within a predetermined range, the reflection height Wsv is expressed by the following relational expression (1-5) using the r-th reflection height Wsvr and kv.

$$Wsv = \frac{\sum_{r=1}^{kv} Wehr}{kv} \tag{1-5}$$

For example, the third reflection height Wsvr is the same as the reflection height Wsv. Further, as shown in the following relational expression (1-6), the value obtained by dividing the product of the prism width Weh and the prism height Wev by the product of the reflection width Wsh and the reflection height Wsv is 1 or less.

$$\frac{Weh \times Wev}{Wsh \times Wsv} \leq 1 \tag{1-6}$$

Therefore, the average area of the prisms 40 when viewed in the normal direction Dn is less than or equal to the average area of the reflecting surfaces 31 when viewed in the normal direction Dn.

The total area S is expressed, for example, by the following relational expression (1-7) using p, q, the prism width Weh, the reflection width Wsh, the prism height Wev and the reflection height Wsv.

$$S = p \times (Weh + Wsh) \times q \times (Wev + Wsv) \tag{1-7}$$

The total prism area E is expressed, for example, by the following relational expression (1-8) using the common coefficient Cn, p, q, the prism width Weh, and the prism height Wev.

$$E = Cn \times p \times q \times Weh \times Wev \tag{1-8}$$

Since the sum of the areas of the reflecting surfaces 31 when viewed in the normal direction Dn is the area obtained by subtracting the total prism area E from the total area S, the reflection area ratio Rw is expressed by the following relational expression (1-9). The reflection area ratio Rw is 0.5 or more.

$$Rw = \frac{S - E}{S} \tag{1-9}$$

-continued
$$= \frac{\{(Weh + Wsh) \times (Wev + Wsv)\} - Cn \times Weh \times Wev}{(Weh + Wsh) \times (Wev + Wsv)}$$

The optical member 10 of the first embodiment is configured as described above. The optical member 10 of the present embodiment makes the scene in the blind area due to the pillar 5 visually recognized by the occupant of the vehicle 1, and deterioration in recognition of the scene in the blind area is restricted. Next, with reference to FIGS. 5 to 7, the visual recognition of the scene in the blind area will be described.

Figure 5:
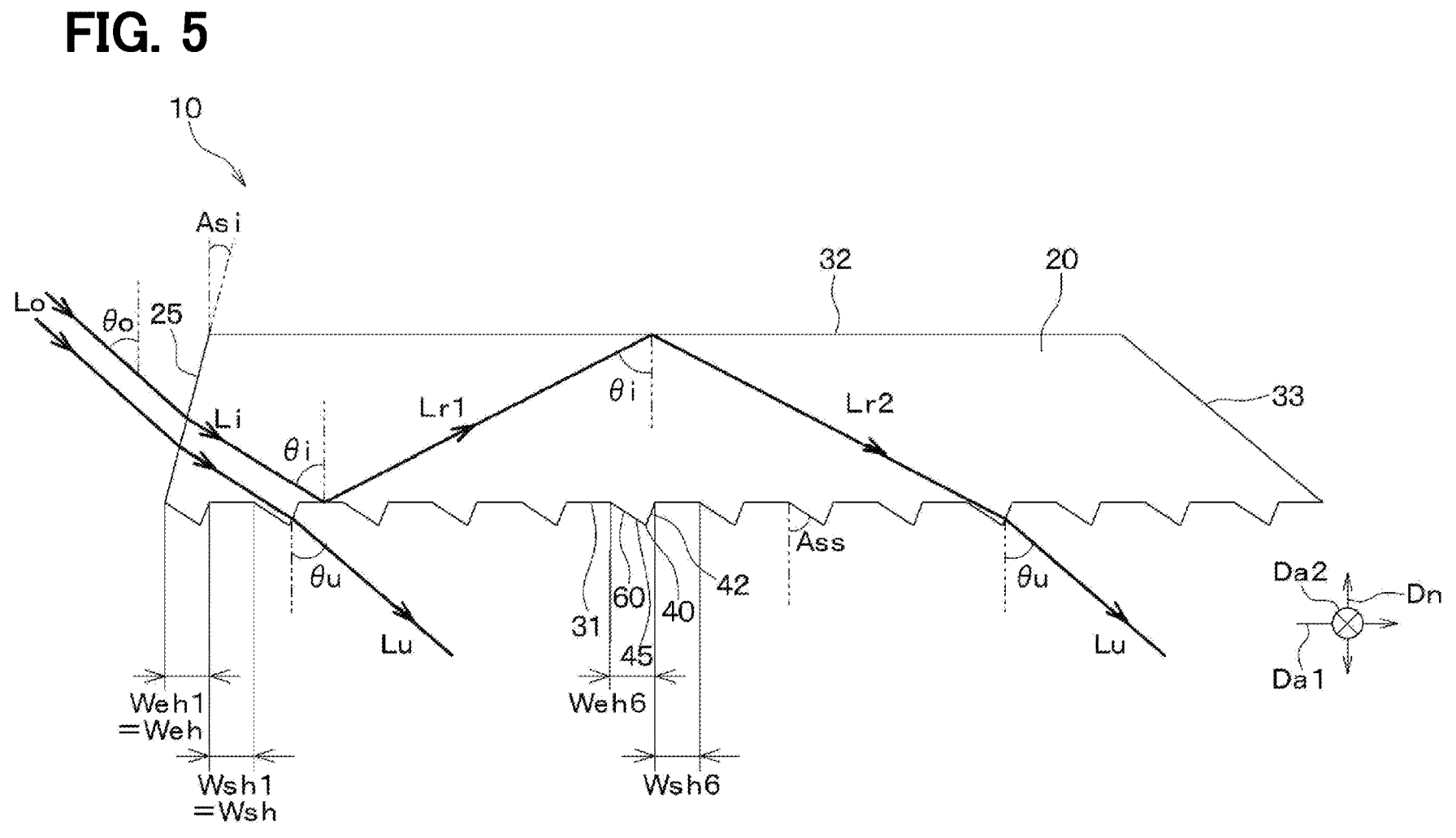

For example, as shown in FIG. 5, when an outside light Lo is incident on the incident surface 25 at an incident angle $\theta o$, the outside light Lo is refracted within the light guide body 20 to become an incident light Li. Note that the incident angle $\theta o$ is an angle formed between a traveling direction of the outside light Lo and the normal direction Dn.

A part of the incident light Li travels toward the reflecting surface 31 at the incident angle $\theta i$ and reaches the reflecting surface 31. The reached incident light Li is totally reflected by the reflecting surface 31 and becomes a first reflected light Lr1. The first reflected light Lr1 travels toward the smooth surface 32 at the incident angle $\theta i$ and reaches the smooth surface 32. The reached first reflected light Lr1 is totally reflected by the smooth surface 32 and becomes a second reflected light Lr2. The second reflected light Lr2 travels toward the prism exit surface 42 and reaches the prism exit surface 42. The reached second reflected light Lr2 exits from the prism exit surface 42 at an exit angle $\theta u$ that is the same as the incident angle $\theta o$, and becomes an exit light Lu. The exit light Lu travels toward and reaches the occupant of the vehicle 1, so that the scene in the blind area due to the pillar 5 is visually recognized by the occupant. The incident angle $\theta i$ is the angle formed between the traveling direction of the incident light Li and the normal direction Dn. The exit angle $\theta u$ is the angle formed by the traveling direction of the exit light Lu and the normal direction Dn. Since Asi $< \pi/2 - \theta i$ is satisfied, the incident angle $\theta i$ is greater than the incident angle $\theta o$. Accordingly, the incident light Li travels toward a wide range of the reflecting surfaces 31. The shielding surface angle Ass, which is the inclination angle of the prism light-shielding surface 45 with respect to the normal direction Dn, is greater than or equal to the incident angle $\theta o$. Since the exit light Lu exits to the outside without being blocked by the prism light-shielding surface 45, the loss of the light amount in the emission is reduced.

A part of the incident light Li travels toward the prism exit surface 42 and reaches the prism exit surface 42. The reached incident light Li exits from the prism exit surface 42 at an exit angle $\theta u$ that is the same as the incident angle $\theta o$, and becomes an exit light Lu. The exit light Lu travels toward and reaches the occupant of the vehicle 1, so that the scene in the blind area due to the pillar 5 is visually recognized by the occupant.

Figure 6:
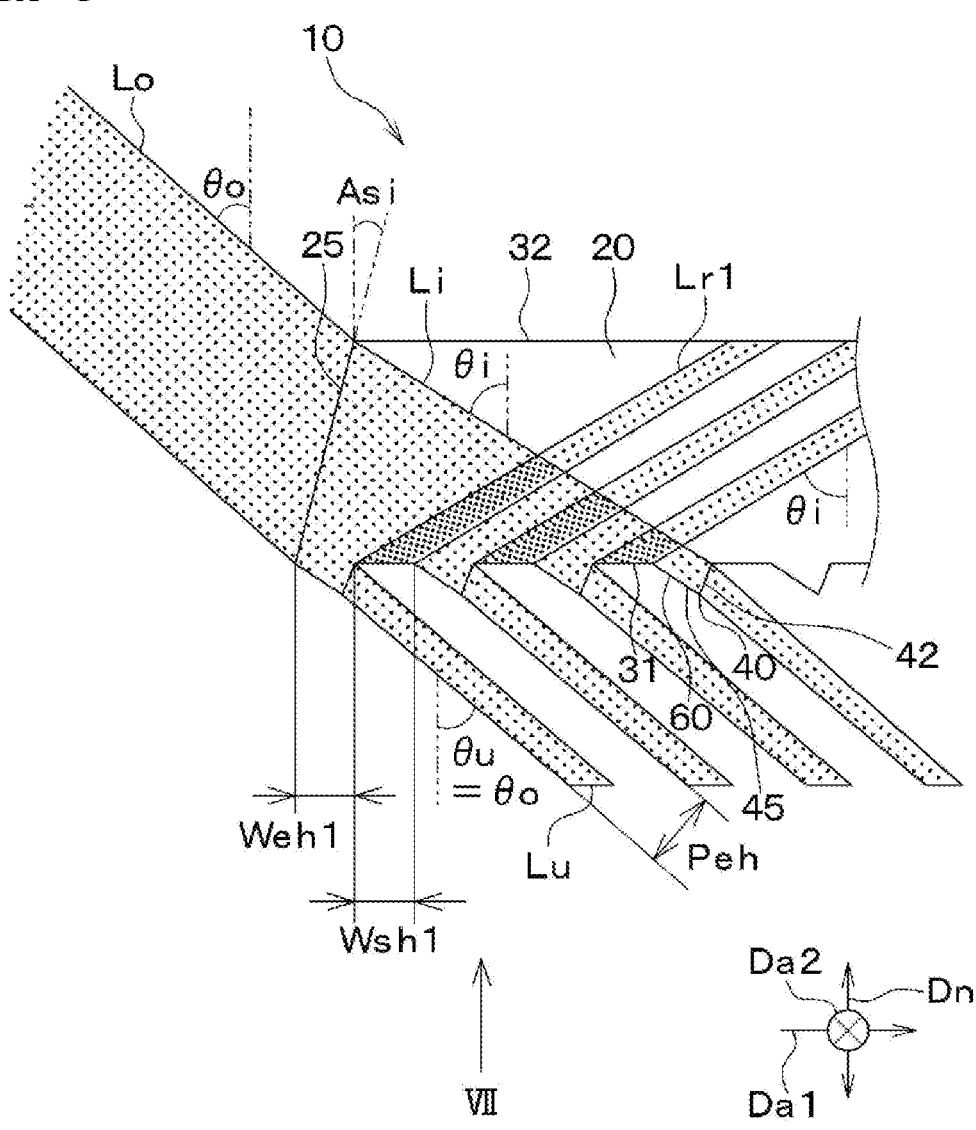
FIG. 6 is a schematic cross-sectional view showing a state in which an outside light is incident on the incident surface of the optical member according to the first embodiment.
Figure 7:
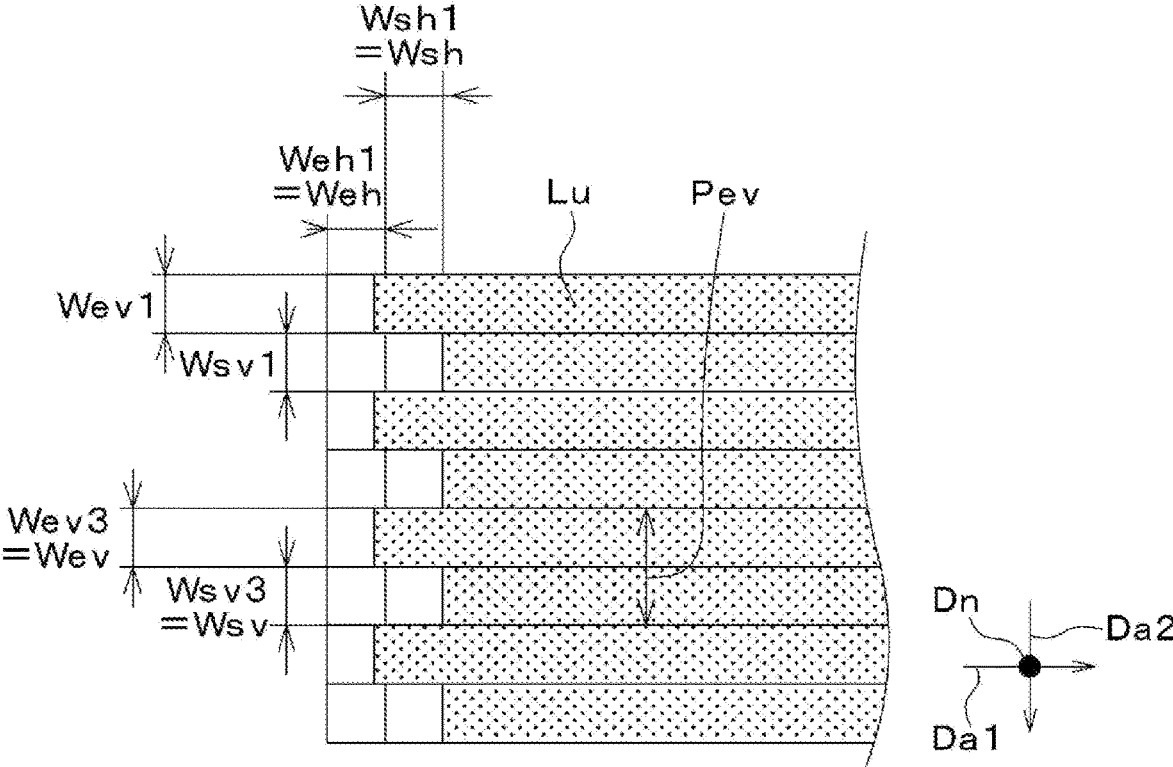
FIG. 7 is a diagram showing the optical member viewed in a direction indicated by an arrow VII in FIG. 6.

As shown in FIG. 6 and FIG. 7, in a direction orthogonal to the traveling direction of the exit lights Lu and the second direction Da2, a length between ends on the same side of the exit lights Lu that exit from any two adjacent prism exit surfaces 42, which are adjacent to each other in the first direction Da1, is denoted as an exit width Peh. In addition, in the second direction Da2, a length between furthest ends of the exit lights Lu that exit from any two adjacent prism exit surfaces 42, which are adjacent to each other in the second direction Da2, is denoted as an exit height Peh. In FIG. 6 and FIG. 7, the ranges of the outside light Lo, the incident light Li, the first reflected light Lr1, and the exit lights Lu are indicated by dot patterns.

At this time, the exit width Peh is expressed by the following relational expression (1-10) using the prism width Weh, the reflection width Wsh, and the incident angle $\theta o$.

$$Peh=(Weh+Wsh)\times\cos\theta o \qquad (1\text{-}10)$$

Also, the exit height Pev corresponds to the sum of the prism height Wev and the reflection height Wsv, and is represented by the following relational expression (1-11) using the prism height Wev and the reflection height Wsv.

$$Pev=Wev+Wsv \qquad (1\text{-}11)$$

The exit width Peh and the exit height Pev are 2 mm or less, which is the minimum size of a pupil of the viewer. As a result, the light amount of the exit light Lu incident on the pupil of the viewer is averaged, thereby restricting a change in brightness accompanying movement of a viewpoint of the viewer.

As described above, the scene in the blind area due to the pillar 5 is visually recognized by the occupant of the vehicle 1. Next, restriction of deterioration in recognition of the scene in the blind area will be described.

Figures 8, 9:
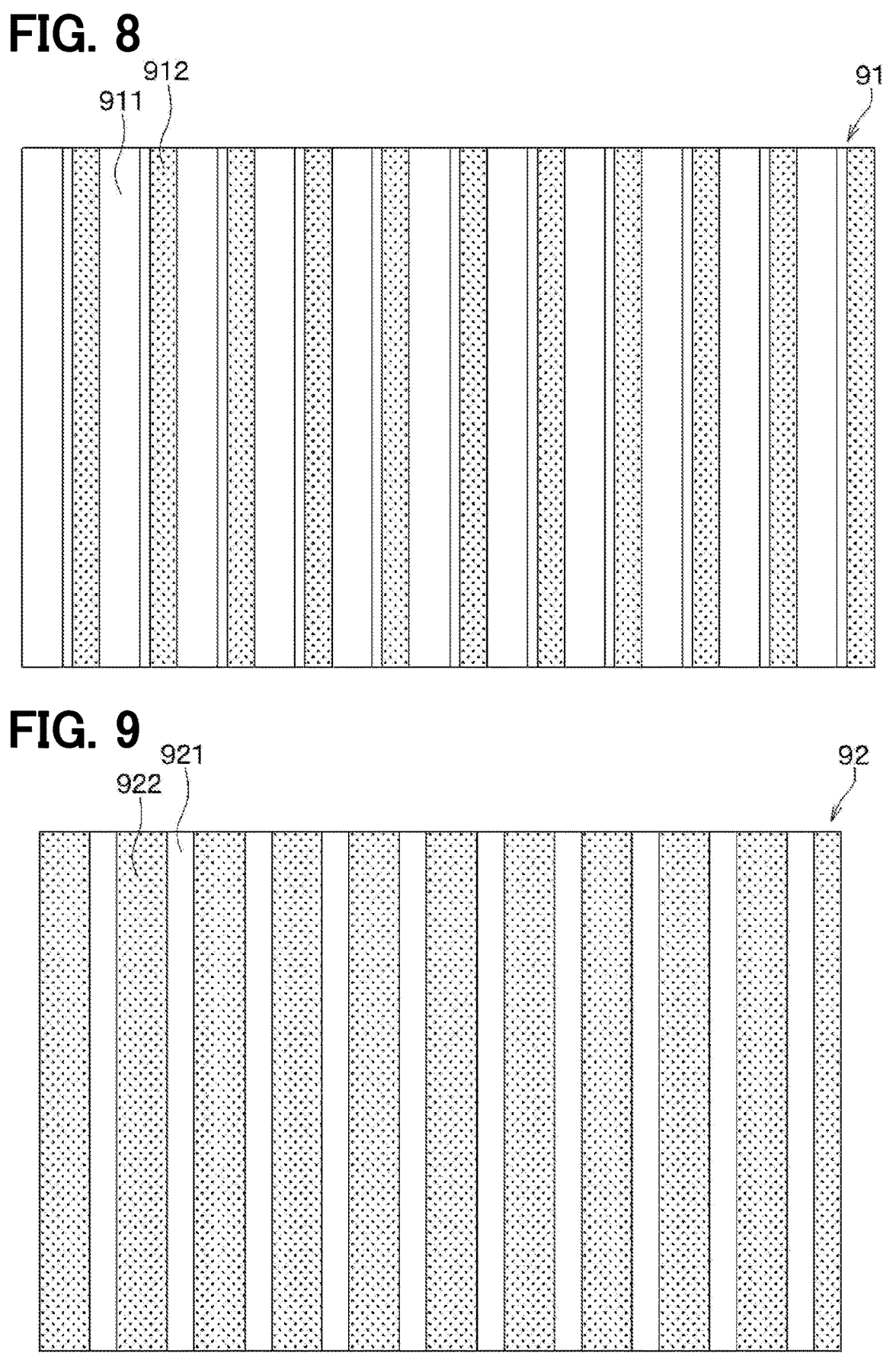

Here, deterioration in recognition of the scene in the blind area will be described using a first optical member 91 according to a comparative example. The first optical member 91 includes multiple first prisms 911 and multiple first reflecting surfaces 912, as shown in FIG. 8. The first prisms 911 protrude from the first reflecting surfaces 912 in a direction in which normal lines of the first reflecting surfaces 912 extend. The first prisms 911 each extends in a vertical direction and are arranged in a horizontal direction on a paper plane of FIG. 8. Each of the first reflecting surfaces 912 is formed between adjacent two of the first prisms 911 such that the first reflecting surfaces 912 each extends in the vertical direction and are arranged in the horizontal direction on the paper plane of FIG. 8. A light incident on the first optical member 91 passes through the inside of the first optical member 91 and is reflected by the first reflecting surface 912. The light reflected by the first reflecting surface 912 is reflected by a surface opposite to the first reflecting surface 912, enters the first prism 911, and exits from the first prism 911. Accordingly, the first optical member 91 can make the scene in the blind area visually recognized by a viewer. However, when the viewer looks at the first optical member 91, the first reflecting surfaces 912 look like stripes each extending in the vertical direction and arranged in the horizontal direction. In addition, in FIG. 8, in order to clarify the positions of the first reflecting surfaces 912, the first reflecting surfaces 912 are indicated by a dot pattern.

When the viewer looks at the scene, since the viewer's eyes are on the left and right, if there are periodic stripes in the vertical direction at a distance different from the scene, a visual processing of the viewer will fuse the scene with the strips. Thus, a visual attraction, which indicates the ease of recognizing the stripes by the viewer, increases, and the fusion of the scene between the left and right eyes is hindered. Furthermore, since moire generated by the vertical stripes of periodic structure moves due to a horizontal movement of both eyes of the viewer, the visual attraction increases. Therefore, recognition of the scene in the blind area reflected on the first optical member 91 is lowered.

On the other hand, in the optical member 10 of the present embodiment, as shown in FIG. 3, the prisms 40 are arranged at intervals in the first direction Da1 and arranged at intervals in the second direction Da2. In addition, since the reflecting surfaces 31 are formed between the prisms 40 adjacent to each other, the reflecting surfaces 31 are arranged at intervals in the first direction Da1 and the second direction Da2. The first direction Da1 is not limited to the direction orthogonal to the normal direction Dn and may also be a direction intersecting the normal direction Dn. The second direction Da2 is not limited to the direction orthogonal to the normal direction Dn and the first direction Da1, and may also be a direction intersecting the normal direction Dn and the first direction Da1.

As a result, when the total area of the reflecting surfaces 31 when viewed in the normal direction Dn is constant, the length of the reflecting surfaces 31 in the second direction Da2, for example, the vertical direction can be decreased by increasing the length of the reflecting surfaces 31 in the first direction Da1, for example, the horizontal direction. Accordingly, recognition of the stripes by the reflecting surfaces 31 can be restricted, so that the visual attraction is lowered. Therefore, deterioration in recognition of the scene in the blind area reflected on the optical member 10 can be restricted.

The first embodiment also achieves the following effects.

Here, a mechanism of the decrease in recognition of the scene in the blind area will be described using a second optical member 92 according to another comparative example. The second optical member 92 includes multiple second prisms 921 and multiple light shielding layers 922, as shown in FIG. 9. The second prisms 921 each extends in a vertical direction and are arranged in a horizontal direction on a paper plane of FIG. 9. The light shielding layers 922 covers surfaces on one side of the second prisms 921. A light incident on the second optical member 92 passes through the inside of the second optical member 92, enters the second prism 921 and exits from the second prism 921. Accordingly, the second optical member 92 can make the scene in the blind area visually recognized by a viewer. However, when the viewer looks at the second optical member 92, the light shielding layers 922 look like stripes each extending in the vertical direction and arranged in the horizontal direction. Due to the strips, the visual attraction, which indicates the ease of recognizing the stripes by the viewer, increase as in the above-described comparative example. Thus, recognition of the scene in the blind area reflected in the second optical member 92 is lowered. In FIG. 9, in order to clarify the positions of the light shielding layers 922, the light shielding layers 922 are indicated by a dot pattern.

On the other hand, the optical member 10 includes the light shielding layers 60. The light shielding layers 60 correspond to light shielding portions and cover portions of the prisms 40 so as to block light from the outside of the light guide body 20 toward the prisms 40. Furthermore, since the prisms 40 are arranged at intervals in the first direction Da1 and the second direction Da2, the light shielding layers 60 are arranged at intervals in the first direction Da1 and are arranged at intervals in the second direction Da2.

As a result, when the total area of the prisms 40 when viewed in the normal direction Dn is constant, the length of the prisms 40 in the second direction Da2, for example, the vertical direction can be decreased by increasing the length of the prisms 40 in the first direction Da1, for example, the horizontal direction. Accordingly, recognition of the stripes by the light shielding layers 60 covering the prisms 40 can be restricted, so that the visual attraction is lowered. Therefore, deterioration in recognition of the scene in the blind area reflected on the optical member 10 can be restricted.

The prisms 40 emit the light from the incident surface 25 and the light reflected by the smooth surface 32 to the outside in the normal direction Dn and the first direction Da1. Also, the exit height Pev corresponding to the sum of the prism height Wev and the reflection height Wsv is 2 mm or less, which is the minimum size of the pupil of the viewer. As a result, the light amount of the exit light Lu incident on the pupil of the viewer is averaged, thereby restricting a change in brightness accompanying movement of the viewpoint of the viewer. Note that the reflection height Wsv corresponds to the length of the reflection surface 31 in the second direction Da2 located between the prisms 40 adjacent to each other in the second direction Da2.

The reflection area ratio Rw is 0.5 or more. As a result, more than half of the light incident on the incident surface 25 can be guided, so that brightness in a wider viewpoint range can be ensured compared with a case where the reflection area ratio Rw is less than 0.5.

As shown in the above relational expression (1-6), the value obtained by dividing the product of the prism width Weh and the prism height Wev by the product of the reflection width Wsh and the reflection height Wsv is 1 or less. Therefore, the average area of the prisms 40 when viewed in the normal direction Dn is less than or equal to the average area of the reflecting surfaces 31 when viewed in the normal direction Dn. As a result, compared to a case where the average area of the prisms 40 when viewed in the normal direction Dn is larger than the average area of the reflecting surfaces 31 when viewed in the normal direction Dn, the light incident on the incident surface 25 is more likely to be reflected by the reflecting surfaces 31, so that the light can be more easily guided. Therefore, compared to the case where the average area of the prisms 40 when viewed in the normal direction Dn is larger than the average area of the reflecting surfaces 31 when viewed in the normal direction Dn, brightness in a wider viewpoint range can be ensured.

Second Embodiment

A light guide body 20 according to a second embodiment of the present disclosure is divided into t regions such that the light guide body 20 has a first region F1, a second region F2, a third region F3, . . . , and a t-th region Ft in order from the side close to the incident surface 25 in the first direction Da1. Further, the light guide body 20 has first reflecting surfaces 311, second reflecting surfaces 312, third reflecting surfaces 313, . . . , and t-th reflecting surfaces 31t instead of the reflecting surfaces 31. Furthermore, the light guide body 20 has first prisms 401, second prisms 402, third prisms 403, . . . , and t-th prisms 40t instead of the prisms 40. The other configurations are similar to those of the first embodiment. Note that t is an integer of 2 or more, and is set according to the number of times the light from the incident surface 25 is reflected within the light guide body 20.

Specifically, the t-th reflecting surfaces 31t and the t-th prisms 40t are formed in the t-th region Ft.

The t-th prism 40t is formed, for example, by molding, cutting, blasting, or a combination thereof when the light guide body 20 is formed. Each of the t-th prisms 40 protrudes from the adjacent t-th reflecting surface 31 and has a triangular prism shape. The t-th prisms 40t are arranged at intervals in the first direction Da1 in the t-th region Ft. Furthermore, the t-th prisms 40t are arranged at intervals in the second direction Da2 in the t-th region Ft. Accordingly, the t-th reflecting surfaces 31t are arranged at intervals in the first direction Da1 and are arranged at intervals in the second direction Da2. Therefore, the t-th prisms 40t and the t-th reflecting surfaces 31t are arranged two-dimensionally in the t-th region Ft. Further, the t-th prisms 40t and the t-th reflecting surfaces 31t are alternately and repeatedly arranged in the first direction Da1 and the second direction Da2 in the t-th region Ft. Each of the t-th prisms 40t includes a t-th prism emit surface 42t and a t-th prism light-shielding surface 45t.

The t-th prism exit surface 42t is connected to the adjacent t-th reflecting surface 31t. The t-th prism exit surface 42t is parallel to the incident surface 25. Thus, the t-th prism exit surface 42t is inclined at an incident surface angle Asi with respect to the normal direction Dn.

The t-th prism light-shielding surface 45t is connected with the t-th prism exit surface 42t while intersecting each other. The t-th prism light-shielding surface 45t is inclined at a shielding surface angle Ass with respect to the normal direction Dn. Furthermore, the t-th prism light-shielding surface 45t is covered with the light shielding layer 60.

Figure 10:
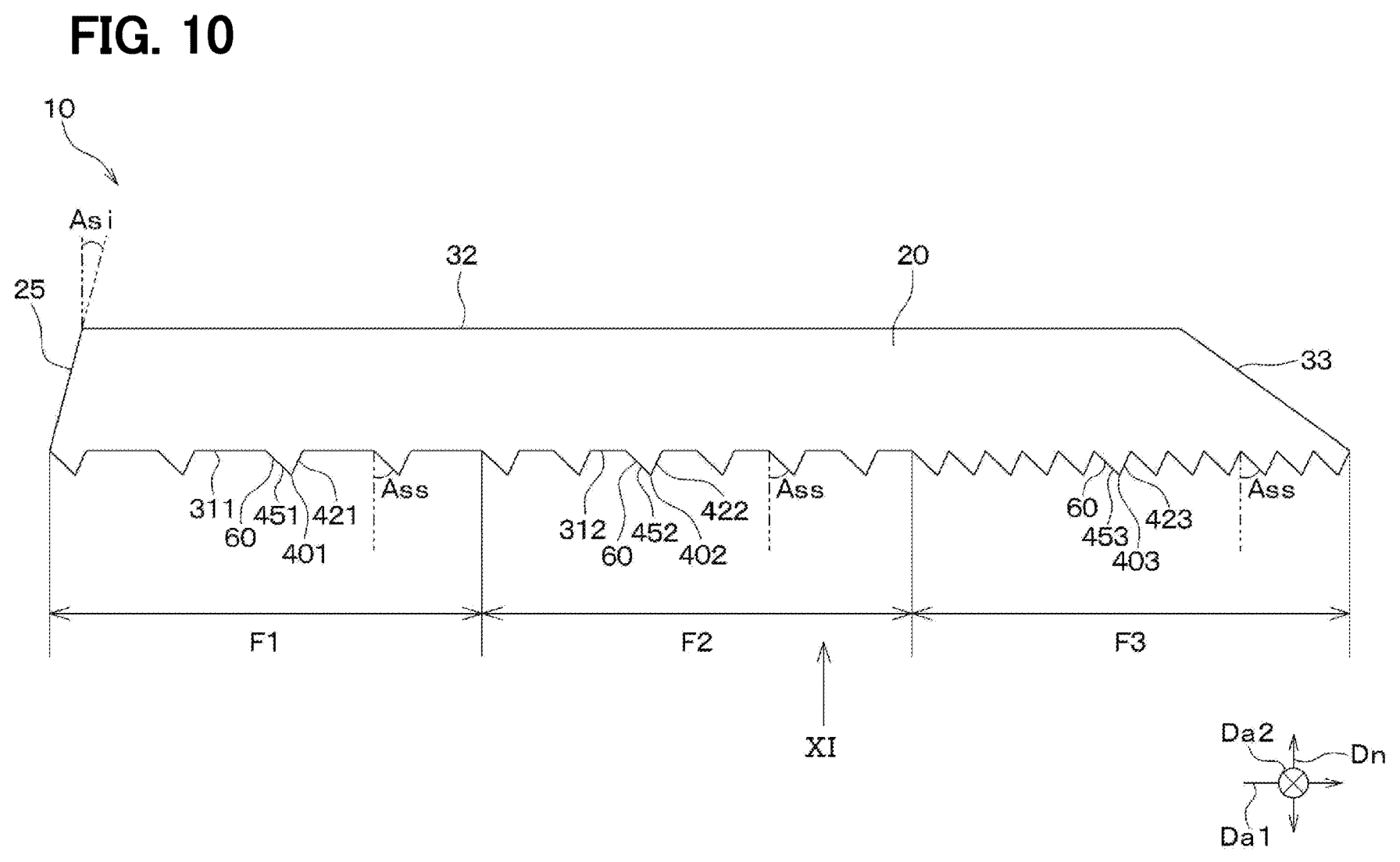
Figure 11:
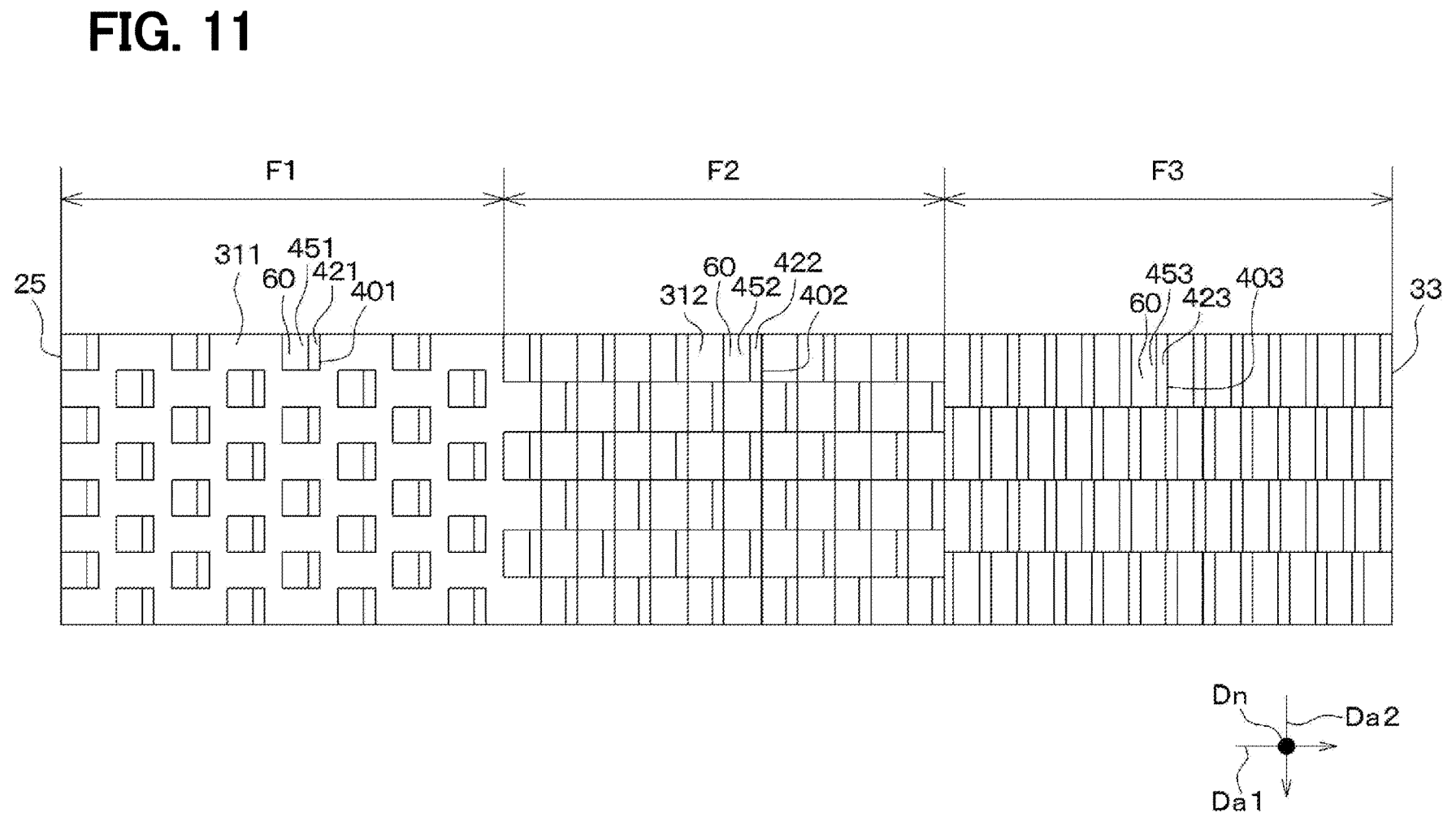

Therefore, if t is 3, as shown in FIG. 10 and FIG. 11, the first reflecting surfaces 311 and the first prisms 401 are formed in the first region F1. The second reflecting surfaces 312 and the second prisms 402 are formed in the second region F2. Furthermore, the third reflecting surfaces 313 and the third prisms 403 are formed in the third region F3. Each of the first prisms 401 includes a first prism exit surface 421 and a first prism light-shielding surface 451. Each of the second prisms 402 includes a second prism exit surface 422 and a second prism light-shielding surface 452. Each of the third prisms 403 includes a third prism exit surface 423 and a third prism light-shielding surface 453.

An average length of the t-th prisms 40t in the first direction Da1 is denoted as a t-th prism width Weht. An average length of the t-th reflecting surfaces 31t in the first direction Da1 is denoted as a t-th reflection width Wsht. An average length of the t-th prisms 40t in the second direction Da2 is denoted as a t-th prism height Wevt. In addition, i, j, m, and r are natural numbers. In the t-th region Ft, a prism width Weh that is an i-th when counted from the side close to the incident surface 25 in the first direction Da1 is denoted as an i-th prism width Wehi. In the t-th region Ft, a reflection width Wsh that is a j-th when counted from the side close to the incident surface 25 in the first direction Da1 is denoted as a j-th reflection width Wshj. In the t-th region Ft, a prism height WeV that is an m-th in a direction from an end of the light guide body 20 toward the second direction Da2 is denoted as an m-th prism height Wevm. In the t-th region Ft, a reflection height WsV that is an r-th in a direction from the end of the light guide body 20 toward the second direction Da2 is denoted as an r-th reflection height Wsvr.

When one t-th prism 40t and one t-th reflecting surface 31t adjacent to the one t-th prism 40t in the first direction Da1 are regarded as one set, the number of sets of the t-th prisms 40t and the t-th reflecting surface 31t in the first direction Da1 is denoted as pt. When one t-th prism 40t and one t-th reflecting surface 31t adjacent to the one t-th prism 40t in the second direction Da2 are regarded as one set, the number of sets of the t-th prism 40t and the t-th reflecting surface 31t in the second direction Da2 is denoted as qt. In the t-th region Ft, the number of t-th prisms 40t in the first direction Da1 is denoted as kh. In the t-th region Ft, the number of t-th prisms 40t in the second direction Da2 is denoted as kv. The number of t-th prisms 40t arranged in a region defined by the sum of the t-th prism width Weht and the t-th reflection width Wsht and the sum of the t-th prism height Wevt and the t-th reflection height Wsvt is denoted as a common coefficient Cnt. The common coefficient Cnt is 2, for example.

When viewed in the normal direction Dn, the sum of areas of the t-th prisms 40t is denoted as a t-th prism total area Et.

An area obtained by adding the sum of areas of the t-th reflecting surfaces 31*t* viewed in the normal direction Dn to the t-th prism total area Et is denoted as a t-th total area St. A ratio of the sum of the areas of the t-th reflecting surfaces 31 viewed in the normal direction to the t-th total area St is denoted as a t-th reflection area ratio Rwt.

The t-th prism width Weht, the t-th reflection width Wsht, the t-th prism height Wevt, the t-th reflection height Wsvt, the i-th prism width Wehi, the j-th reflection width Wshj, the m-th prism height Wevm, and the r-th reflection height Wsvr are set to 0.1 mm or more. Since the i-th prism width Wehi has a length within a predetermined range, the t-th prism width Weht is expressed by the following relational expression (2-1) using the i-th prism width Wehi and kh.

$$Weht = \frac{\sum_{i=1}^{kh} Wehi}{kh} \tag{2-1}$$

Since the j-th reflection width Wshj has a length within a predetermined range, the t-th reflection width Wsht is expressed by the following relational expression (2-2) using the j-th reflection width Wshj and kh.

$$Wsht = \frac{\sum_{j=1}^{kh} Wshj}{kh} \tag{2-2}$$

Since the m-th prism height Wevm is a length within a predetermined range, the t-th prism height Wevt is expressed by the following relational expression (2-3) using the m-th prism height Wevm and kv.

$$Wevt = \frac{\sum_{m=1}^{kv} Wevm}{kv} \tag{2-3}$$

Since the r-th reflection height Wsvr has a length within a predetermined range, the t-th reflection height Wsvt is expressed by the following relational expression (2-4) using the r-th reflection height Wsvr and kv.

$$WsvT = \frac{\sum_{r=1}^{kv} Wehr}{kv} \tag{2-4}$$

The t-th total area St is expressed, for example, by the following relational expression (2-5) using pt, qt, the t-th prism width Weht, the t-th reflection width Wsht, the t-th prism height Wevt and the t-th reflection height Wsvt.

$$St=pt\times(Weht+Wsht)\times qt\times(Wevt+Wsvt) \tag{2-5}$$

Furthermore, the t-th prism total area Et is expressed by the following relational expression (2-6) using, for example, the t-th common coefficients Cnt, pt, qt, the t-th prism width Weht, and the t-th prism height Wevt.

$$Et=Cnt\times pt\times qt\times Weht\times Wevt \tag{2-6}$$

Since the sum of the areas of the t-th reflecting surface 31*t* when viewed from the normal direction Dn is the area obtained by subtracting the t-th prism total area Et from the t-th total area St, the t-th reflection area ratio Rwt is expressed by the following relational expression (2-7).

$$Rwt = \frac{St - Et}{St} \tag{2-7}$$
$$= \frac{\{(Weht + Wsht)\times(Wevt + Wsvt)\} - Cnt\times Weht\times Wevt}{(Weht + Wsht)\times(Wevt + Wsvt)}$$

For example, the first total area S1, the second total area S2, the third total area S3, . . . , and the t-th total area St are the same as each other, and the first common coefficient Cn1, the second common coefficient Cn2, the third common coefficient Cn3, . . . , and the t-th common coefficient Cnt are the same as each other. The areas decrease in the order of the first reflecting surface 311, the second reflecting surface 312, the third reflecting surface 313, . . . , and the t-th reflecting surface 31*t*. Thus, the light guide body 20 is configured so as to satisfy the following relational expression (2-8).

$$Rwt1 > Rwt2 > Rwt3 > \ldots > Rwtm \tag{2-8}$$

In addition, in the t-th region Ft that is the rearmost region when counted from the side close to the incident surface 25 in the first direction Da1, the area of the t-th reflecting surface 31*t* is zero. Therefore, the light guide body 20 is configured so as to satisfy the following relational expression (2-9).

$$Rwtm=0 \tag{2-9}$$

As a result, the t-th prism exit surface 42*t* that is the rearmost prism exit surface when counted from the side close to the incident surface 25 in the first direction Da1 is connected with the connecting surface 33. The t-th prisms 40*t* are arranged in the second direction Da2 such that the positions of any two adjacent t-th prisms 40*t*, which are adjacent to each other in the second direction Da2, do not coincide with each other in the first direction Da1. In this example, the first total area S1, the second total area S2, the third total area S3, . . . , and the t-th total area St are the same as each other, the first common coefficient Cn1, the second common coefficient Cn2, the third common coefficient Cn3, . . . , and the t-th common coefficient Cnt are the same as each other, and the areas decrease in the order of the first reflecting surface 311, the second reflecting surface 312, the third reflecting surface 313, . . . , and the t-th reflecting surface 31*t*. Accordingly, the above relational expression (2-8) is satisfied. However, the present disclosure is not limited to the above-described example. For example, the first prism total area E1, the second prism total area E2, the third prism total area E3, . . . , and the t-th prism total area Et may be the same as each other, and the area may increase in the order of the first total area S1, the second total area S2, the third total area S3, . . . , and the t-th total area St. In another example, the first total area S1, the second total area S2, the third total area S3, . . . , and the t-th total area St are assumed to be the same as each other. In addition, the first prism width Weh1, the second prism width Weh2, the third prism width Weh3, . . . , and the t-th prism width Weht are assumed to be the same as each other. The first reflection width Wsh1, the second reflection width Wsh2, the third reflection width Wsh3, . . . , and the t-th reflection width Wsht are also assumed to be the same as each other. The first prism height Wev1, the second prism height Wev2, the third prism height Wev3, . . . , and the t-th prism height Wevt are also assumed to be the same as each other. The first reflection height Wsv1, the second reflection height Wsv2, the third reflection height Wsv3, . . . , and the t-th reflection height Wsvt are also assumed to be the same as each other. In this example, the coefficients may increase in order of the first common coefficient Cn1, the second common coefficient Cn2, the third common coefficient Cn3, . . . , the t-th common coefficient Cnt. Accordingly, the above relational expression (2-8) is satisfied.

Here, t is assumed to be 3. At this time, since the area of the third reflecting surface 313 is zero in the third region F3, which is the rearmost region when counted from the side close to the incident surface 25 in the first direction Da1, the third reflection area ratio Rw3 is zero. As a result, the third prism exit surface 423 that is the rearmost prism exit surface when counted from the side close to the incident surface 25 in the first direction Da1 is connected with the connecting surface 33. The third prisms 403 are arranged in the second direction Da2 such that the positions of any two adjacent third prisms 403, which are adjacent to each other in the second direction Da2, do not coincide with each other in the first direction Da1. Since the area of the third reflecting surface 313 is zero, illustration of the third reflecting surface 313 is omitted in FIG. 10 and FIG. 11. In FIG. 11, the third prism height Wev3 is greater than the second prism height Wev2 as an example. However, the third prism height Wev3 may be less than or equal to the second prism height Wev2.

The first reflection area ratio Rw1 is assumed to be 67%. Furthermore, the second reflection area ratio Rw2 is assumed to be 50%. At this time, since 33% of the amount of light from the incident surface 25 is emitted from the first prism exit surfaces 421, so the remaining 67% of the amount of light is reflected by the first reflecting surfaces 311 and the smooth surface 32. Then, 50% of the amount of light reflected by the first reflecting surfaces 311 and the smooth surface 32 is emitted from the second prism exit surfaces 422. Therefore, 33.5% of the amount of light from the incident surface 25 is emitted from the second prism exit surfaces 422.

In addition, 50% of the amount of light reflected by the first reflecting surfaces 311 and the smooth surface 32 is reflected by the second reflecting surfaces 312 and the smooth surface 32. Furthermore, since the area of the third reflecting surface 313 is zero, the light reflected by the second reflecting surfaces 312 and the smooth surface 32 is emitted from the third prism exit surfaces 423. Therefore, 33.5% of the amount of light from the incident surface 25 is emitted from the third prism exit surfaces 423.

Therefore, 33% of the amount of light from the incident surface 25 is emitted from the first prism exit surfaces 421, and 33.5% of the amount of light from the incident surface 25 is emitted from the second prism exit surfaces 422 and the third prism exit surfaces 423. Therefore, the amount of light emitted from the first prism exit surfaces 421, the amount of light emitted from the second prism exit surfaces 422, and the amount of light emitted from the third prism exit surfaces 423 become almost uniform. Accordingly, variations in brightness in the first region F1, the second region F2, and the third region F3 can be reduced.

The optical member 10 of the second embodiment is configured as described above. The second embodiment achieves effects similar to the effects achieved by the first embodiment. The second embodiment also achieves the following effects.

The t-th reflection area ratio Rwt on a side opposite to the incident surface 25 in the first direction Da1 is smaller than the first reflection area ratio Rw1 on the side close to the incident surface 25.

As a result, the amount of light emitted from the first prism exit surfaced 421 and the amount of light emitted from the t-th prism exit surfaces 42t are more likely to be uniform. Therefore, variations in brightness among regions can be reduced. In addition, since the lengths of the first reflecting surfaces 311 and the t-th reflecting surfaces 31t in the first direction Da1 and the second direction Da2 are different, recognition of stripes by the first reflecting surfaces 311 and the t-th reflecting surfaces 31t can be restricted, so that the visual attraction is more likely to be lowered. Therefore, deterioration in recognition of the scene in the blind area reflected on the optical member 10 can be more likely to be restricted.

The t-th prism exit surface 42t that is the rearmost prism exit surface when counted from the side close to the incident surface 25 in the first direction Da1 is connected with the connecting surface 33 while intersecting each other. It should be noted that "from the side close to the incident surface 25 in the first direction Da1" means "in a direction from the incident surface 25 toward the connecting surface 33".

Accordingly, in the t-th region Ft located on the side opposite to the incident surface 25, the light reflected by the smooth surface 32 is restricted from being reflected and emitted from the connecting surface 33. Therefore, a decrease in the amount of light emitted from the light guide body 20 is restricted.

In the t-th region Ft that is the rearmost region when counted from the side close to the incident surface 25 in the first direction Da1, the t-th prism exit surfaces 42t are arranged in the second direction Da2 such that the positions of any two adjacent t-th prisms 40t, which are adjacent to each other in the second direction Da2, do not coincide with each other in the first direction Da1. Accordingly, the positions of the stripes formed in the adjacent t-th prisms 40t do not coincide with each other in the first direction Da1, so that the stripes are restricted from continuing in the second direction Da2. Therefore, recognition of the stripes by the light shielding layers 60 covering the t-th prism exit surfaces 42t can be restricted, so that the visual attraction is more likely to be lowered. Therefore, deterioration in recognition of the scene in the blind area reflected on the optical member 10 can be more likely to be restricted.

Third Embodiment

Figure 12:
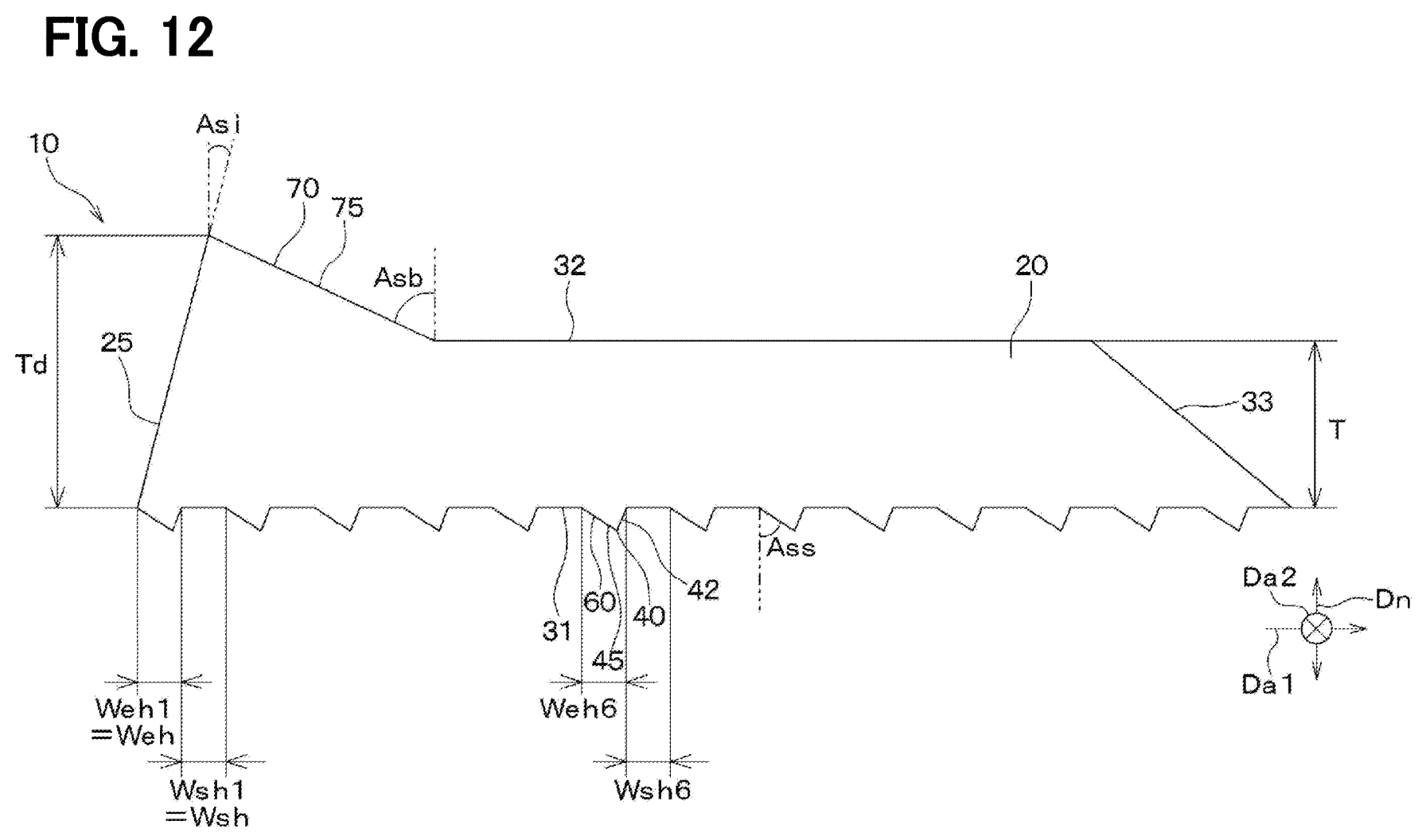

A light guide body 20 according to a third embodiment of the present disclosure further includes an inclined surface 70 and an inclined surface light-shielding layer 75 as shown in FIG. 12. The other configurations are the same as those of the first embodiment.

The inclined surface 70 is inclined with respect to the normal direction Dn. The inclined surface 70 is connected with the incident surface 25 while intersecting each other and is connecting with the smooth surface 32 while intersecting each other. An inclined surface angle Asb that is an angle of the inclined surface 70 with respect to the normal direction Dn is smaller than the incident angle θi. Furthermore, a distance Td from a boundary between the inclined surface 70 and the incident surface 25 to the reflecting surfaces 31 in the normal direction Dn is longer than a distance T from a boundary between the inclined surface 70 and the smooth surface 32 to the reflecting surfaces 31 in the normal direction Dn. The incident angle θi is the angle formed between the traveling direction of the incident light Li and the normal direction Dn as described above. Furthermore, the incident light Li is the light incident on the incident surface 25 and refracted within the light guide body 20 as described above.

The inclined surface light-shielding layer 75 is a light absorption film that absorbs 99% or more of light, and covers the inclined surface 70. The inclined surface light-shielding layer 75 is formed of, for example, black resin by coating, printing, vapor deposition, or the like. Although the inclined surface light-shielding layer 75 in this example is made of black resin, the material of the inclined surface light-shielding layer 75 is not limited to black resin. For example, the inclined surface light-shielding layer 75 may be made of metal.

The optical member 10 of the third embodiment is configured as described above. The third embodiment achieves effects similar to the effects achieved by the first embodiment. The third embodiment also achieves the following effects.

Figure 13:
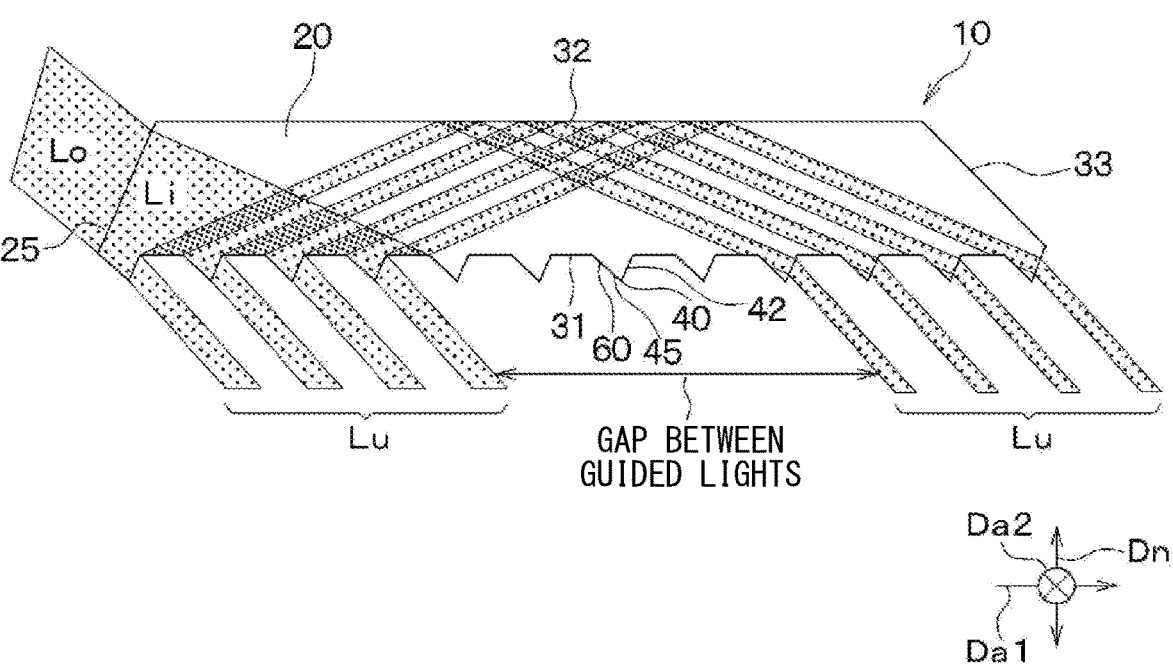
FIG. 13 is a schematic cross-sectional view showing a state in which an outside light is incident on an incident surface of the optical member according to the third embodiment.

As shown in FIG. 13, the exit lights Lu may be separated by the multiple reflecting surfaces 31, and a gap of guided lights that is a relatively large gap between the emit lights Lu may be generated. Due to the gap of the guided lights, there may be a region where the guided outside light Lo is not visually recognized.

In the present embodiment, the light guide body 20 includes the inclined surface 70. The inclined surface 70 is connected with the incident surface 25 and the smooth surface 32 while intersecting each other. The distance Td from the boundary between the inclined surface 70 and the incident surface 25 to the reflecting surfaces 31 in the normal direction Dn is longer than the distance T from a boundary between the inclined surface 70 and the smooth surface 32 to the reflecting surfaces 31 in the normal direction Dn.

Accordingly, the size of the incident surface 25 is increased as compared with the case where the inclined surface 70 is not provided, so that the range of the outside light Lo incident on the incident surface 25 is increased. Thus, the generation of the gap of the guided lights can be restricted. Thus, the generation of the region where the guided outside light Lo is not visually recognized can be restricted.

Fourth Embodiment

Figure 14:
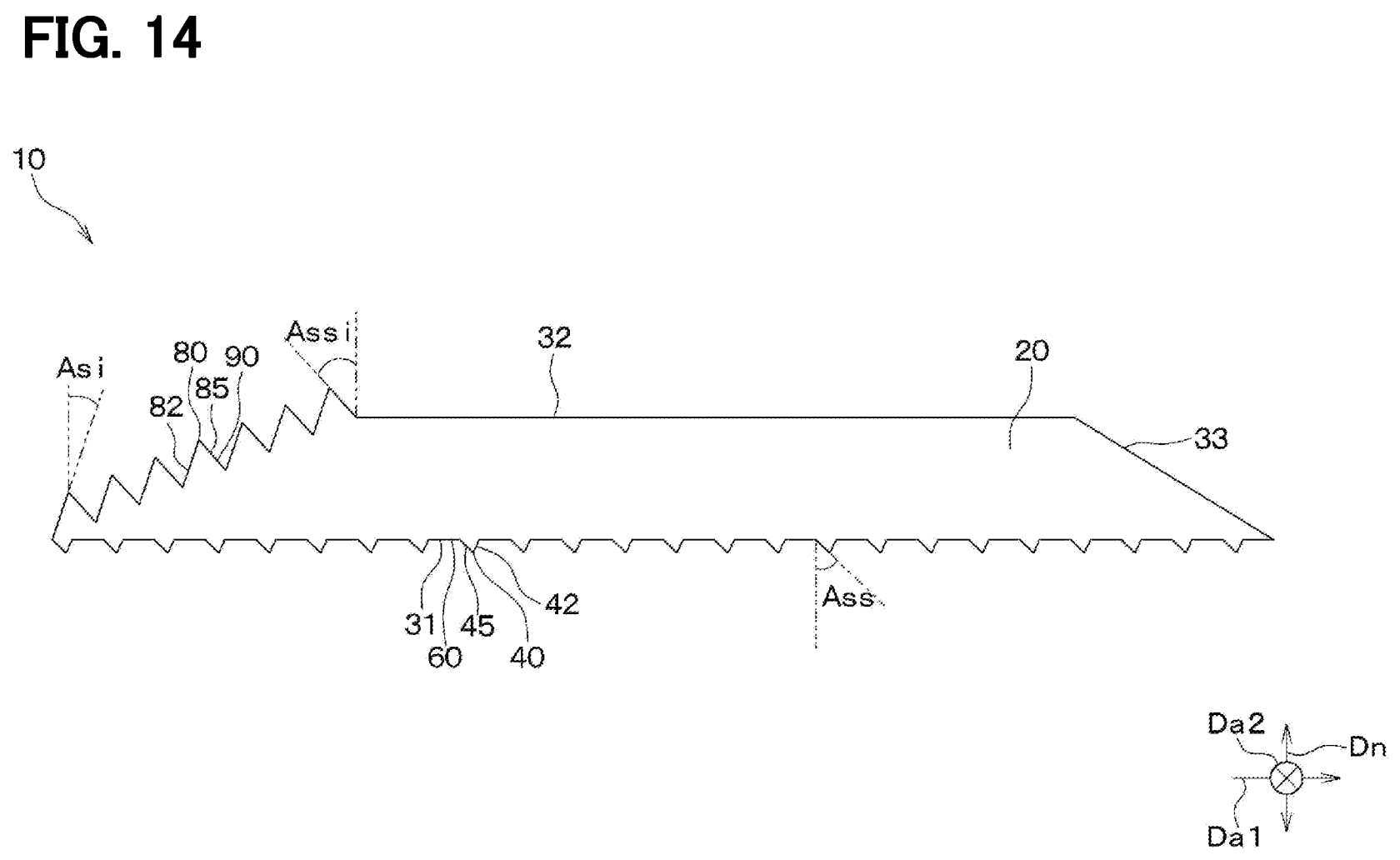

A light guide body 20 according to a fourth embodiment of the present disclosure does not include the incident surface 25. The light guide body 20 includes multiple incident prisms 80 in addition to the reflecting surfaces 31, the smooth surface 32, the connecting surface 33, and the multiple prisms 40 as shown in FIG. 14. In addition, an optical member 10 according to the fourth embodiment includes incident light-shielding layers 90 in addition to the light guide body 20 and the light shielding layers 60. The other configurations are similar to those of the first embodiment.

The incident prisms 80 are formed, for example, by molding, cutting, blasting, or a combination thereof when the light guide body 20 is formed. Each of the incident prisms 80 protrudes from the inside of the light guide body 20 toward the outside and has a triangular prism shape. The incident prisms 80 are arranged at predetermined intervals in a direction intersecting the normal direction Dn, the first direction Da1 and the second direction Da2. Thus, distances from the incident prisms 80 to the reflecting surfaces 31 in the normal direction Dn are different from each other. Each of the incident prisms 80 includes a prism incident surface 82 and an incident light-shielding surface 85.

The prism incident surfaces 82 correspond to the incident surface 25, and are surfaces on which the outside light Lo is incident. The prism incident surfaces 82 are parallel to the prism exit surfaces 42 and intersect the reflecting surfaces 31 and the smooth surface 32. An inclination angle of the prism incident surfaces 82 with respect to the normal direction Dn is the same as the incident surface angle Asi described above. One of the prism incident surfaces 82 opposite to the smooth surface 32 is connected to the prism light-shielding surface 45 of the prism 40.

Each of the incident light-shielding surfaces 85 is connected with the adjacent prism incident surface 82 while intersecting each other. One of the incident light-shielding surfaces 85 adjacent to the smooth surface 32 is connected with the smooth surface 32 while intersecting each other. The incident light-shielding surfaces 85 are inclined with respect to the normal direction Dn. An incident light-shielding surface angle Assi that is an inclination angle of the incident light-shielding surfaces 85 with respect to the normal direction Dn2 is equal to or greater than the incident angle $\theta$o and is equal to or less than the incident angle $\theta$i. The incident angle $\theta$o is the angle formed between the traveling direction of the outside light Lo and the normal direction Dn as described above. The incident angle $\theta$i is the angle formed between the traveling direction of the incident light Li and the normal direction Dn as described above. Furthermore, the incident light Li is the light incident on the incident surface 25 and refracted within the light guide body 20 as described above.

The incident light-shielding layers 90 are light absorbing films that absorb 99% or more of light. The incident light-shielding layers 90 are formed of, for example, black resin by coating, printing, vapor deposition, or the like. The incident light-shielding layers 90 cover the entire surface of the respective incident light-shielding surfaces 85. The incident light-shielding layers 90 block light traveling from the blind area toward the incident prisms 80.

The optical member 10 of the fourth embodiment is configured as described above. The fourth embodiment achieves effects similar to the effects achieved by the first embodiment. The fourth embodiment also achieves the following effects.

The light guide body 20 includes the multiple incident prisms 80 into which the outside light Lo is incident. Since the surface of the light guide body 20 on which the outside light Lo is incident are multiple surfaces, the range of the outside light Lo incident into the light guide body 20 is likely to be larger than a case where the surface of the light guide body 20 on which the outside light Lo is incident is a single surface. Therefore, the generation of the gap of the guided light is restricted, and accordingly, the generation of the region where the guided outside light Lo is not visually recognized is restricted.

The incident light-shielding surface angle Assi is equal to or greater than the incident angle $\theta$o and is equal to or less than the incident angle $\theta$i. As a result, ranges of lights emitted from the adjacent prism incident surfaces 82 are likely to overlap, so that generation of a gap of guided lights formed between the guided lights emitted from the adjacent prism incident surfaces 82 can be restricted. Thus, the generation of the gap of the guided lights, that is a relatively large gap formed between the exit lights Lu separated by the multiple reflecting surface 31 can be restricted. Thus, the generation of the region where the guided outside light Lo is not visually recognized can be restricted.

Fifth Embodiment

Figure 15:
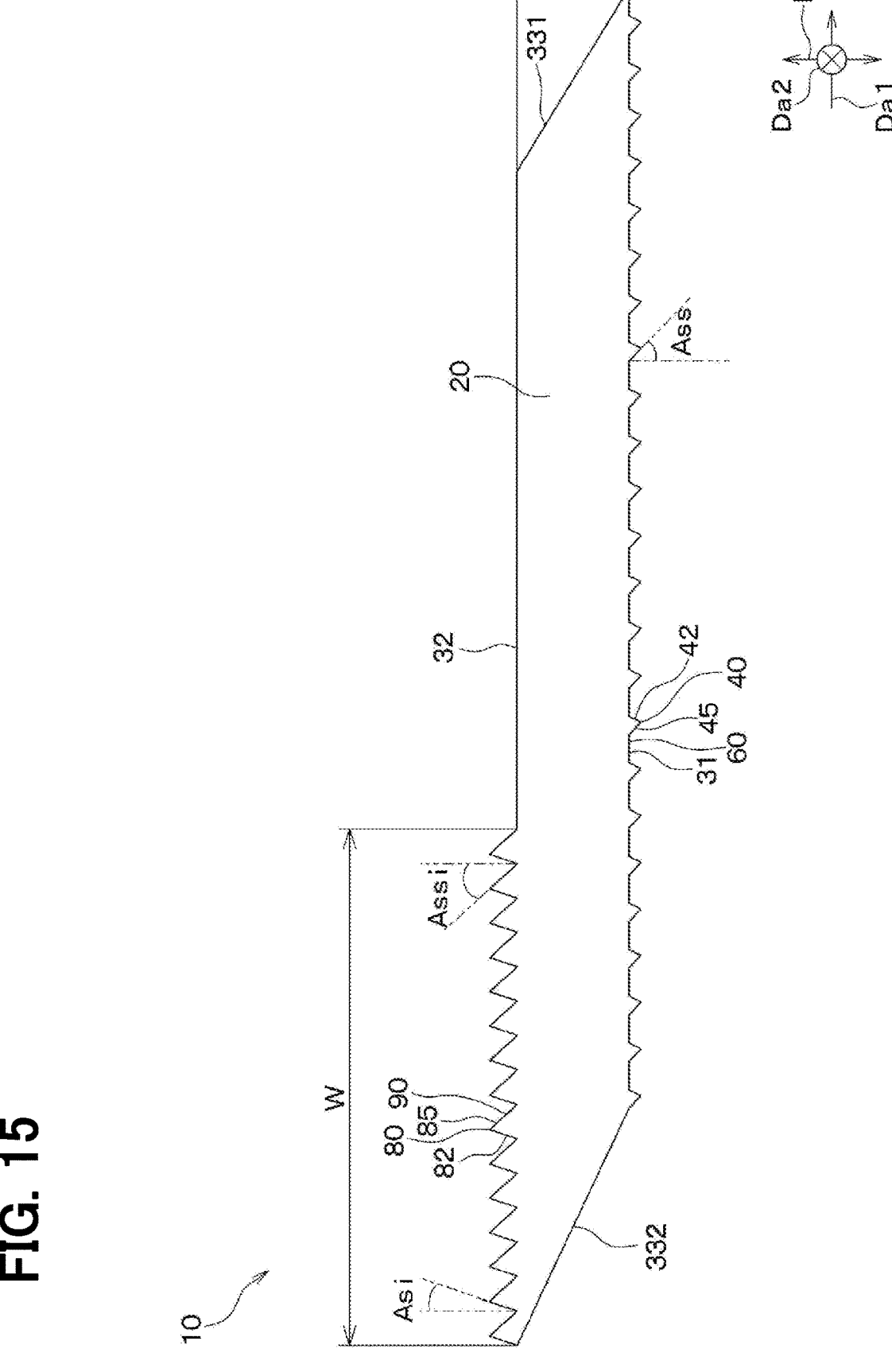
FIG. 15 is a cross-sectional view of an optical member according to a fifth embodiment.

A light guide body 20 according to a fifth embodiment of the present disclosure includes a first connecting surface 331 and a second connecting surface 332 instead of the connecting surface 33 as shown in FIG. 15. In addition, the configurations of the incident prisms 80 are different from those of the fourth embodiment. The other configurations are similar to those of the fourth embodiment.

The first connecting surface 331 corresponds to the connecting surface 33 and is connected with the reflecting surfaces 31 and the smooth surface 32 while intersecting each other. The second connecting surface 332 is located on a side of the light guide body 20 opposite to the first connecting surface 331. The second connecting surfaces 332 is connected with the prism incident surface 82 of the incident prism 80 located opposite to the smooth surface 32 and the prism light-shielding surface 45 of the prism 40 while intersecting each other. The second connecting surface 332 intersects the reflecting surfaces 31 and the smooth surface 32.

The multiple incident prisms 80 are arranged in the first direction Da1. Thus, distances from the incident prisms 80 to the reflecting surfaces 31 in the normal direction Dn are the same as each other. Note that "the same" includes the manufacturing error range.

A distance from the smooth surface 32 to the reflecting surfaces 31 in the normal direction Dn is denoted as T. In addition, a distance from a boundary between the second connecting surface 332 and the prism incident surface 82 to a boundary between the smooth surface 32 and the incident light-shielding surface 85 in the first direction Da1 is denoted as W.

The distances from the respective incident prisms 80 to the reflecting surfaces 31 in the normal direction Dn is approximately the same as T. The light guide body 20 is configured so as to satisfy the following relational expression (3). In the following relational expression (3), "=" includes the manufacturing error range.

$$W = 2 \times T \times \tan \theta i \tag{3}$$

The incident angle θi is the angle formed between the traveling direction of the incident light Li and the normal direction Dn as described above. Furthermore, the incident light Li is the light incident on the incident surface 25 and refracted within the light guide body 20 as described above.

The optical member 10 of the fifth embodiment is configured as described above. The fifth embodiment achieves effects similar to the effects achieved by the fourth embodiment. The fifth embodiment also achieves the following effects.

Figure 16:
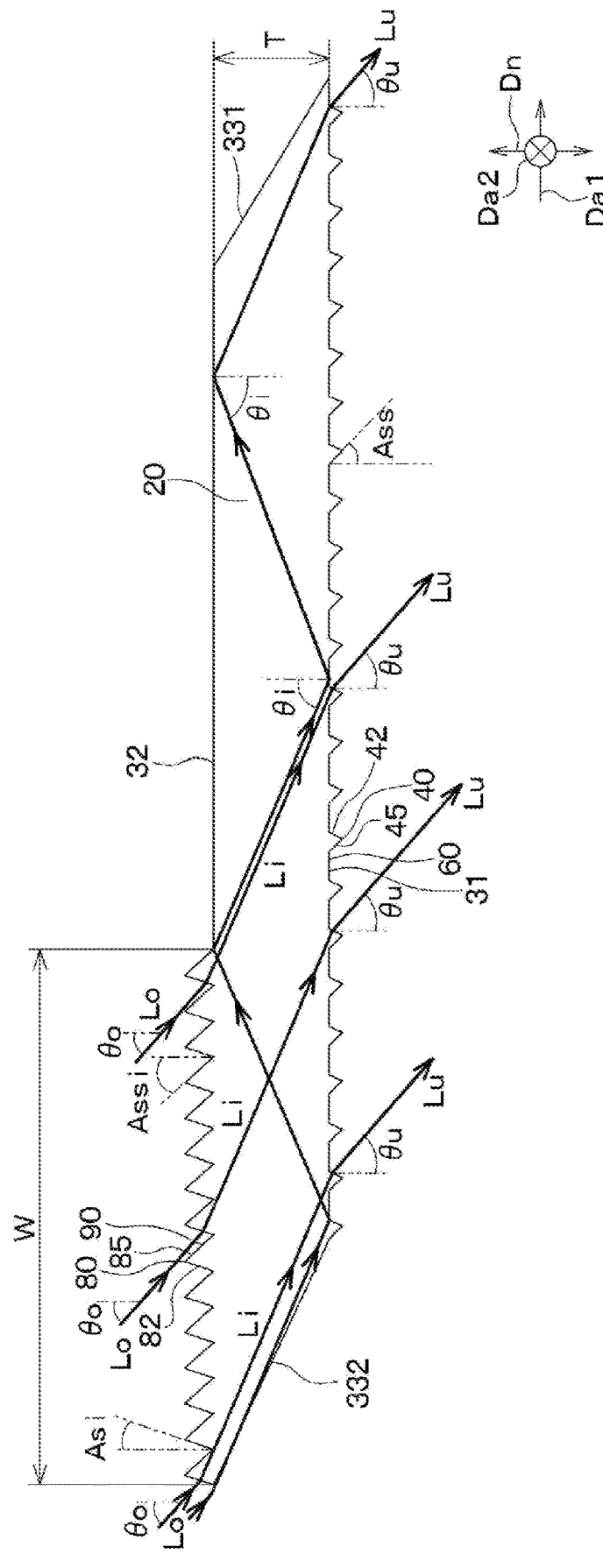
FIG. 16 is a schematic cross-sectional view showing a state in which an outside light is incident on an incident surface of the optical member according to the fifth embodiment.

The distances from the respective incident prisms 80 to the reflecting surfaces 31 in the normal direction Dn are the same as each other. As a result, as shown in FIG. 16, optical path lengths of lights from the prism incident surfaces 82 to the prism exit surfaces 42 are likely to be the same as each other, so that distortion of an image formed by the lights emitted from the prism exit surfaces 42 can be restricted.

The light guide body 20 is configured so as to satisfy the above relational expression (3). Accordingly, the light reflected by the reflecting surfaces 31 is restricted from reaching the incident prisms 80. Thus, the generation of the region where the light is not emitted from the prism exit surfaces 42 can be restricted, and the decrease in the amount of light emitted from the prism exit surfaces 42 can be restricted.

Sixth Embodiment

Figure 17:
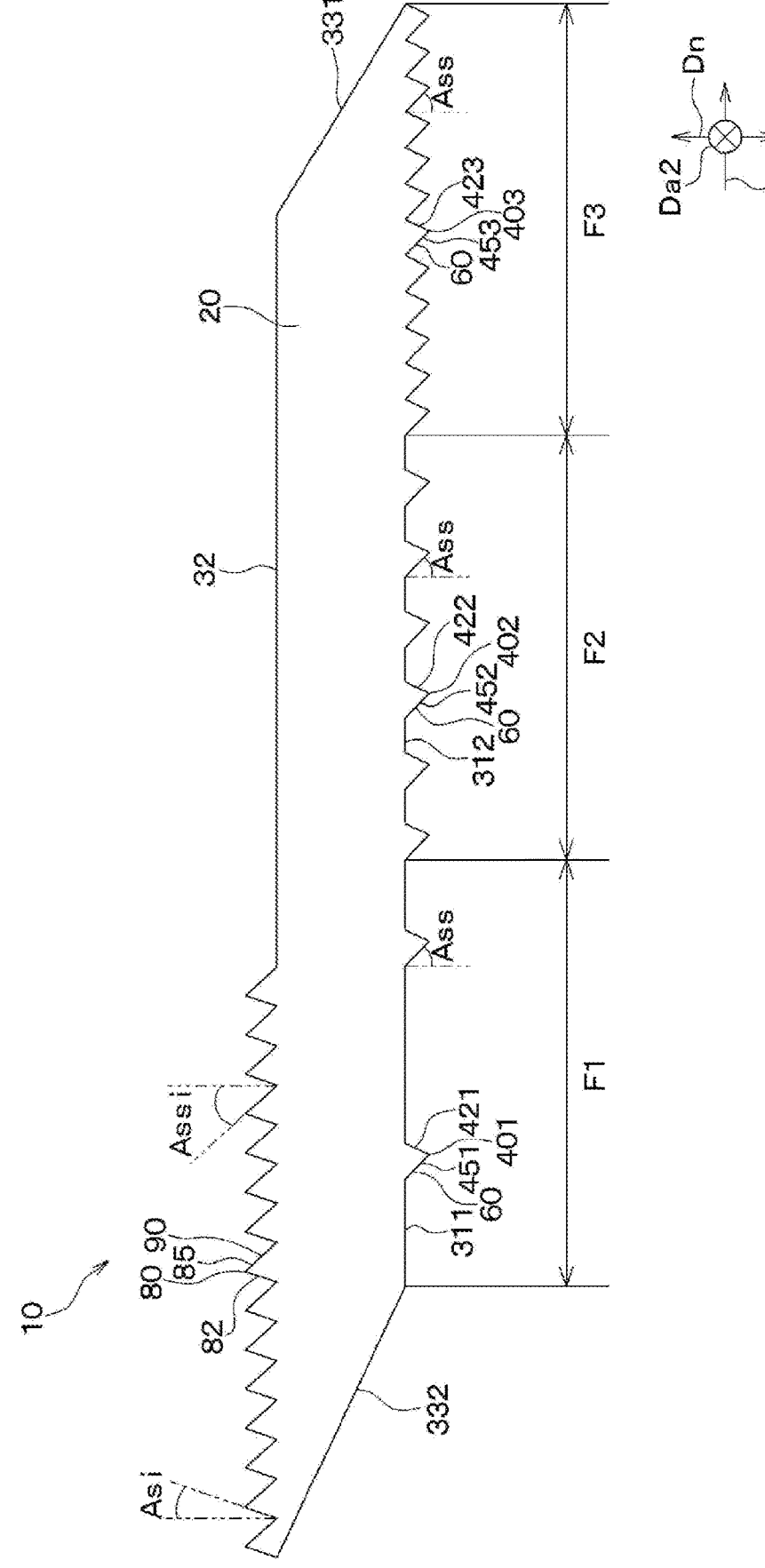
FIG. 17 is a cross-sectional view of an optical member according to a sixth embodiment.
Figure 18:
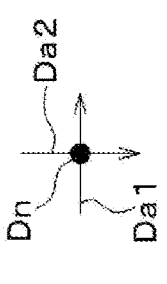
FIG. 18 is a diagram showing the optical member viewed in a direction indicated by an arrow XVIII in FIG. 17.

As shown in FIG. 17 and FIG. 18, a sixth embodiment is a combination of the second embodiment and the fifth embodiment. In a light guide body 20 according to the sixth embodiment, as shown in FIG. 18, the first connecting surface 331 and the second connecting surface 332 are inclined with respect to the second direction Da2. Furthermore, since the first connecting surface 331 is inclined with respect to the second direction Da2, a boundary between the first connecting surface 331 and the third prism 403 connected with the first connecting surface 331 is inclined with respect to the second direction Da2.

The optical member 10 of the sixth embodiment is configured as described above. The sixth embodiment achieves effects similar to the effects achieved by the second embodiment and the fifth embodiment. The sixth embodiment also achieves the following effects.

While the pillar 5 is inclined with respect to the vertical direction of the vehicle 1, the first connecting surface 331 and the second connecting surface 332 are inclined with respect to the second direction Da2. Thus, by making the vertical direction of the vehicle 1 correspond to the second direction Da2, the shape of the pillar 5 and the shape of the light guide body 20 are easily matched, so that the optical member 10 can be easily attached to the pillar 5.

Seventh Embodiment

Figure 19:
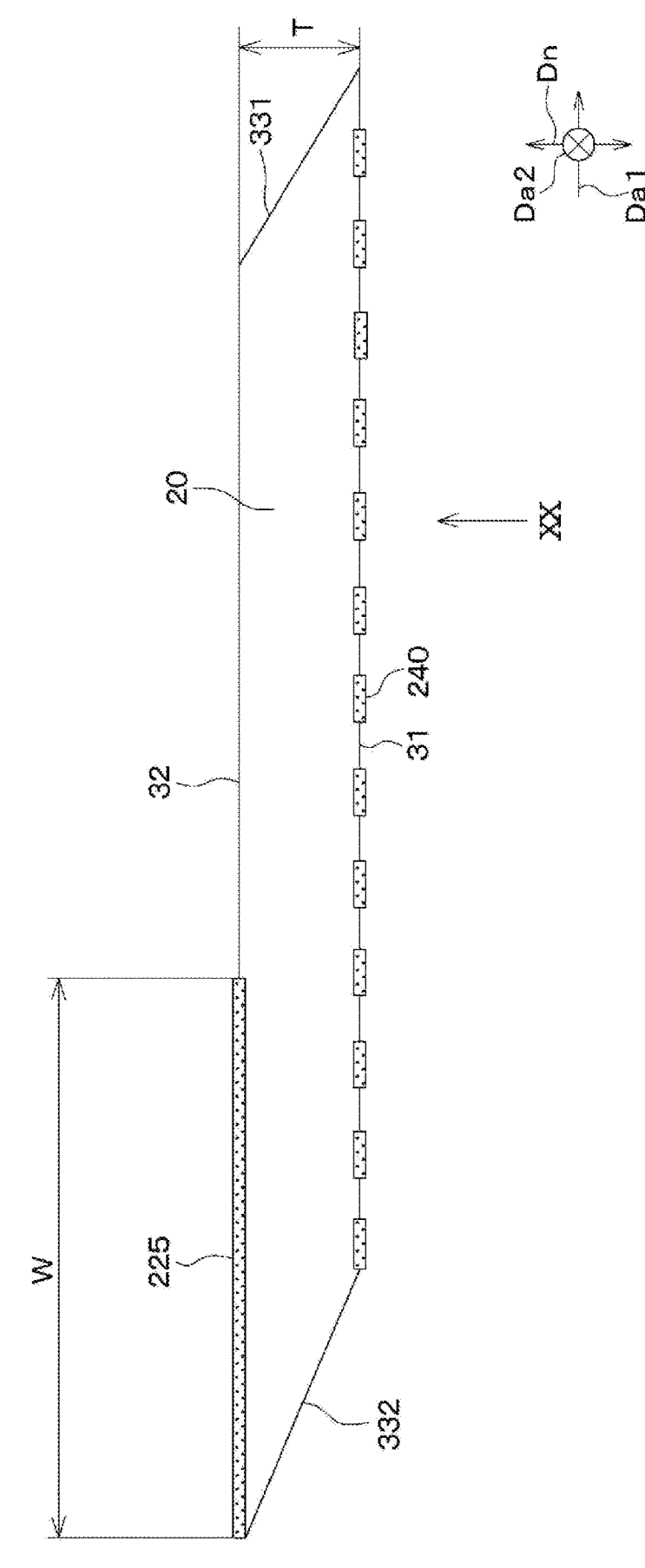
FIG. 19 is a cross-sectional view of an optical member according to a seventh embodiment.
Figure 20:
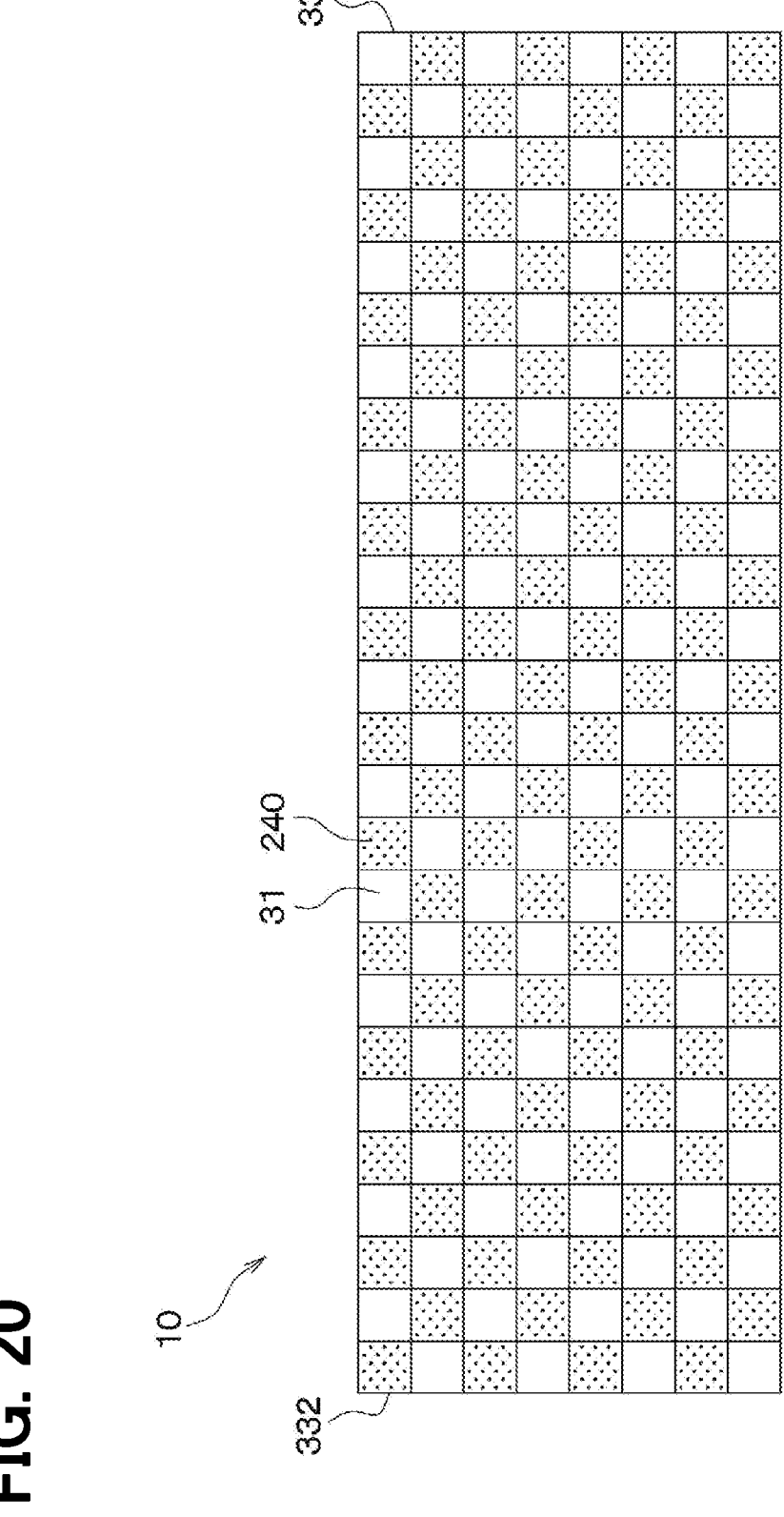
FIG. 20 is a diagram of the optical member viewed in a direction indicated by an arrow XX in FIG. 19.

An optical member 10 according to a seventh embodiment of the present disclosure does not include the light shielding layers 60 as shown in FIG. 19 and FIG. 20. A light guide body 20 according to the seventh embodiment includes a first connecting surface 331, a second connecting surface 332, an incident diffraction grating 225 and exit diffraction gratings 240 instead of the incident surface 25, the connecting surface 33 and the prisms 40. The other configurations are similar to those of the first embodiment. In FIG. 19 and FIG. 20, the incident diffraction grating 225 and the exit diffraction gratings 240 are indicated by a dot pattern in order to clarify the positions of the incident diffraction grating 225 and the exit diffraction gratings 240.

The first connecting surface 331 corresponds to the connecting surface 33 and is connected with the reflecting surfaces 31 and the smooth surface 32 while intersecting each other. The second connecting surface 332 is located on the side of the light guide body 20 opposite to the first connecting surface 331.

The incident diffraction grating 225 corresponds to an incident portion and has minute unevenness of 10 μm or less. The incident diffraction grating 225 is disposed on the smooth surface 32 and is connected with the smooth surface 32. In addition, the incident diffraction grating 225 is connected with the second connecting surface 332 while intersecting each other. A distance from the smooth surface 32 to the reflecting surfaces 31 in the normal direction Dn is denoted as T. A length of the incident diffraction grating 225 in the first direction Da1 is denoted as W. At this time, the incident diffraction grating 225 is configured so as to satisfy the above relational expression (3).

The exit diffraction gratings 240 correspond to exit portions and have minute unevenness of 10 μm or less. The exit diffraction gratings 240 are disposed on the reflecting surfaces 31, and are arranged at intervals in the first direction Da1. Furthermore, the exit diffraction gratings 240 are arranged at intervals in the second direction Da2. Accordingly, the reflecting surfaces 31 are arranged at intervals in the first direction Da1 and are arranged at intervals in the second direction Da2. Thus, the exit diffraction gratings 240 and the reflecting surfaces 31 are arranged two-dimensionally. Furthermore, the exit diffraction gratings 240 and the reflecting surfaces 31 are alternately and repeatedly arranged in the first direction Da1 and the second direction Da2. The widths, the heights, and the areas of the exit diffraction gratings 240 and the reflecting surfaces 31 when viewed in the normal direction Dn are set similarly to the widths, the heights, and the areas of the prisms 40 and the reflecting surfaces 31 in the first embodiment.

The optical member 10 of the seventh embodiment is configured as described above. Also by the optical member 10 according to the seventh embodiment, the scene in the blind area due to the pillar 5 can be visually recognized by the occupant of the vehicle 1 by the following mechanism.

Figure 21:
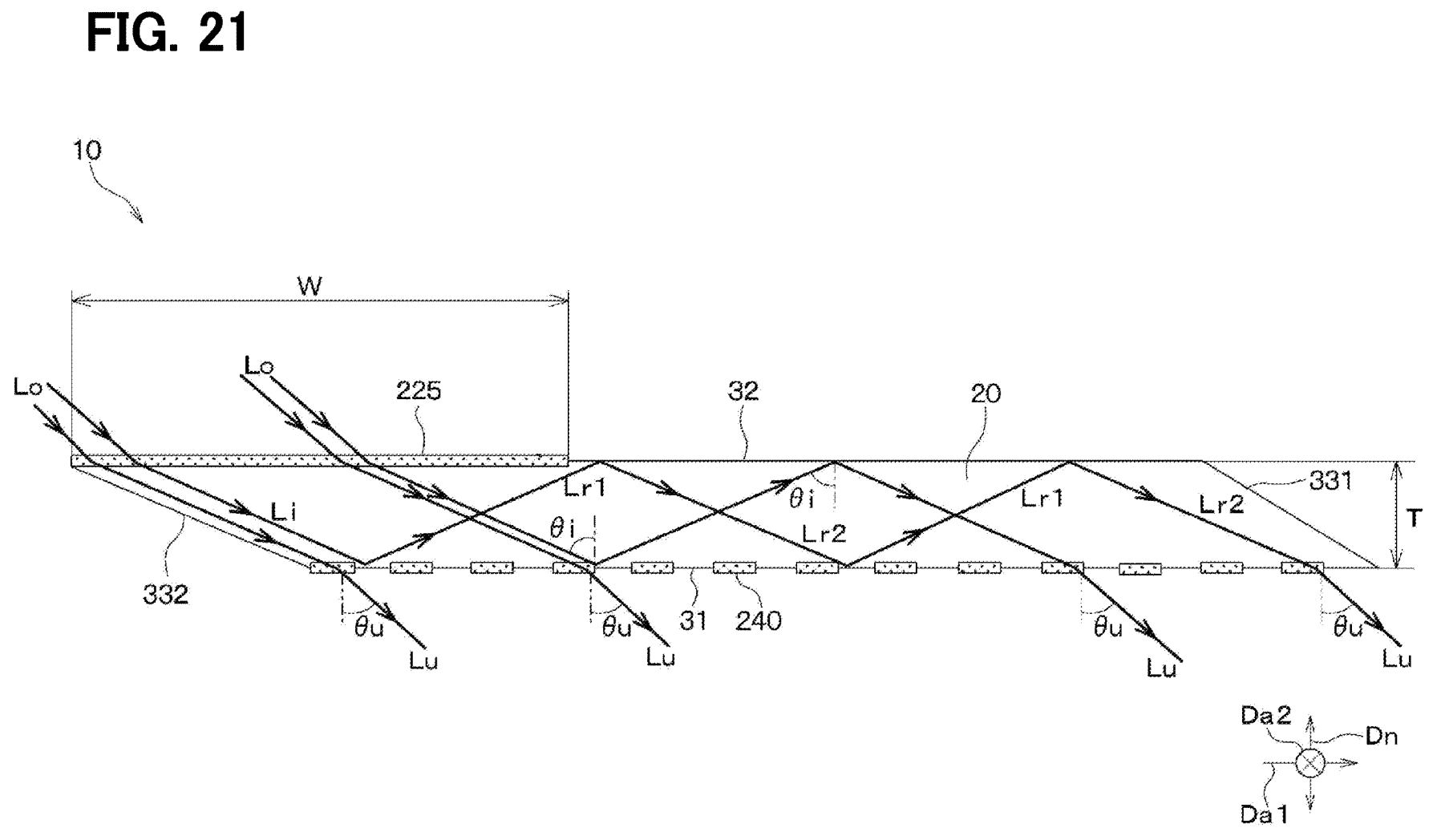

For example, as shown in FIG. 21, when an outside light Lo is incident on the incident diffraction grating 225 at the incident angle θo, the light incident on the incident diffraction grating 225 is diffracted by the minute unevenness of the incident diffraction grating 225. Accordingly, the light incident on the incident diffraction grating 225 is refracted within the light guide body 20 and becomes an incident light Li. The incident angle θo is the angle formed between the traveling direction of the outside light Lo and the normal direction Dn as described above.

A part of the incident light Li travels toward the reflecting surface 31 at the incident angle θi and reaches the reflecting surface 31. The reached incident light Li is totally reflected by the reflecting surface 31 and becomes a first reflected light Lr1. The first reflected light Lr1 travels toward the smooth surface 32 at the incident angle θi and reaches the smooth surface 32. The reached first reflected light Lr1 is totally reflected by the smooth surface 32 and becomes a second reflected light Lr2. Furthermore, the second reflected light Lr2 travels toward the exit diffraction grating 240 and reaches the exit diffraction grating 240. The reached second reflected light Lr2 is diffracted by the minute unevenness of the exit diffraction grating 240, and is emitted as an exit light Lu from the exit diffraction grating 240 at an exit angle θu that is the same as the incident angle θo. The exit light Lu travels toward and reaches the occupant of the vehicle 1, so that the scene in the blind area due to the pillar 5 is visually recognized by the occupant. The incident angle θi is the angle formed between the traveling direction of the incident light Li and the normal direction Dn as described above. The exit angle θu is the angle formed by the traveling direction of the exit light Lu and the normal direction Dn as described above. In addition, $Asi < \pi/2 - \theta i$ is satisfied in a manner similar to the first embodiment. The sizes and the directions of the minute unevenness of the incident diffraction grating 225 and exit diffraction gratings 240 are adjusted so that the exit angle θu becomes the same as the incident angle θi.

In addition, a part of the incident light Li travels toward the exit diffraction grating 240 and reaches the exit diffraction grating 240. The reached incident light Li is diffracted by the minute unevenness of the exit diffraction grating 240, and is emitted as an exit light Lu from the exit diffraction grating 240 at an exit angle θu that is the same as the incident angle θo. The exit light Lu travels toward and reaches the occupant of the vehicle 1, so that the scene in the blind area due to the pillar 5 is visually recognized by the occupant.

As described above, also by the optical member 10 according to the seventh embodiment, the scene in the blind area due to the pillar 5 can be visually recognized by the occupant of the vehicle 1. The seventh embodiment achieves effects similar to the effects achieved by the first embodiment.

Eighth Embodiment

Figure 22:
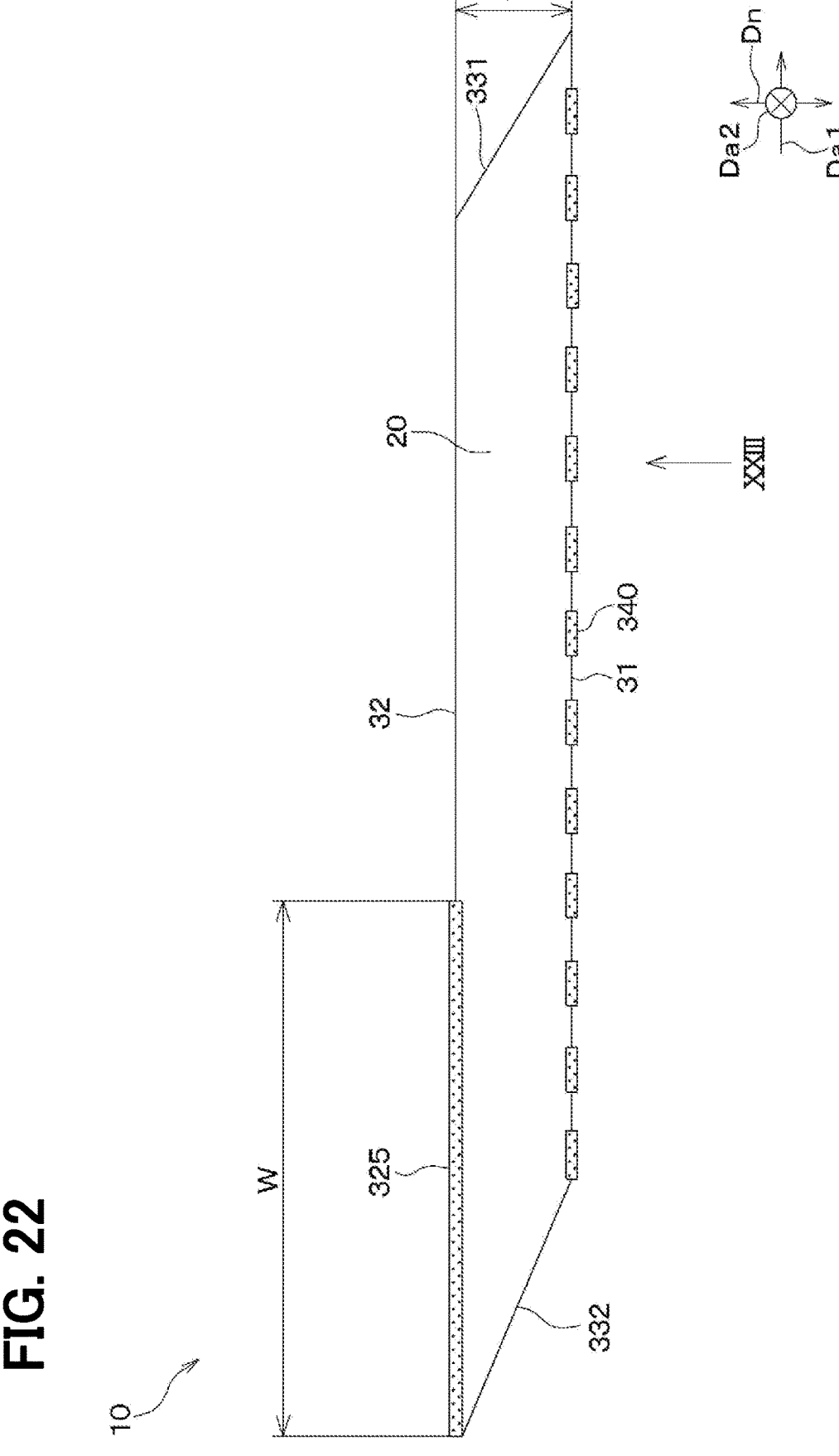
FIG. 22 is a cross-sectional view of an optical member according to an eighth embodiment.
Figure 23:
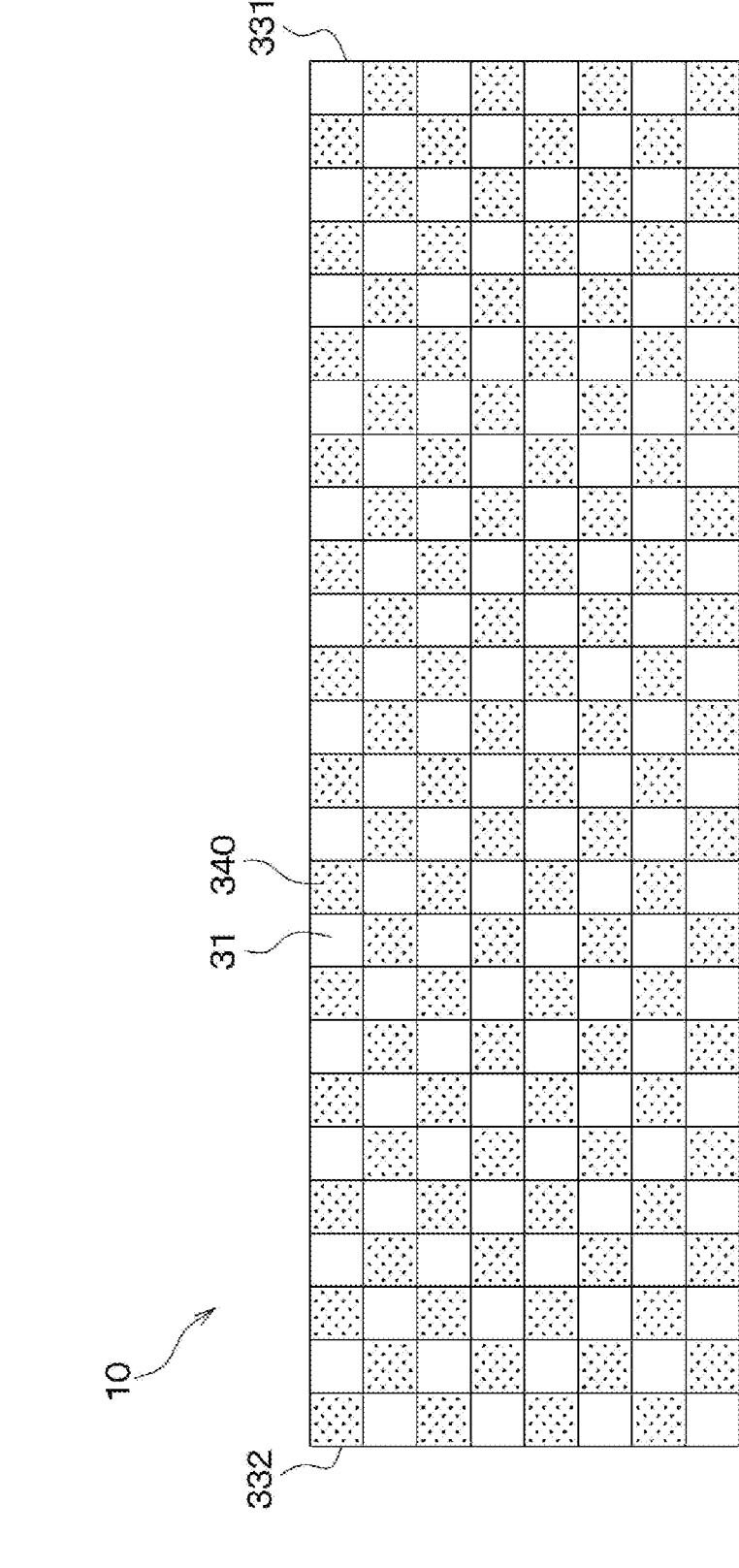
FIG. 23 is a diagram showing the optical member viewed in a direction indicated by an arrow XXIII in FIG. 22.

A light guide body 20 according to an eighth embodiment of the present disclosure includes, as shown in FIG. 22 and FIG. 23, an incident hologram 325 and exit holograms 340 instead of the incident diffraction grating 225 and exit diffraction gratings 240. The other configurations are the same as those of the seventh embodiment. In FIG. 22 and FIG. 23, the incident hologram 325 and the exit holograms 340 are indicated by a dot pattern in order to clarify the positions of the incident hologram 325 and the exit holograms 340.

The incident hologram 325 corresponds to a first hologram, and records an amplitude and a phase of an electric field of a predetermined light by having minute unevenness. When light is incident on the incident hologram 325, the incident light is refracted due to interference. The incident hologram 325 is disposed on the smooth surface 32 and connected with the smooth surface 32. In addition, the incident hologram 325 is connected with the second connecting surface 332 while intersecting each other. A distance from the smooth surface 32 to the reflecting surfaces 31 in the normal direction Dn is denoted as T. In addition, a length of the incident hologram 325 in the first direction Da1 is denoted as W. At this time, the incident hologram 325 is configured so as to satisfy the above relational expression (3).

The exit holograms 340 correspond to second holograms, and record an amplitude and a phase of an electric field of a predetermined light by having minute unevenness. When light is incident on the exit holograms 340, the incident light is refracted due to interference. The exit holograms 340 are arranged at intervals in the first direction Da1. Furthermore, the exit holograms 340 are arranged at intervals in the second direction Da2. Accordingly, the reflecting surfaces 31 are arranged at intervals in the first direction Da1 and are arranged at intervals in the second direction Da2. Thus, the exit holograms 340 and the reflecting surfaces 31 are arranged two-dimensionally. Furthermore, the exit holograms 340 and the reflecting surfaces 31 are alternately and repeatedly arranged in the first direction Da1 and the second direction Da2. The widths, the heights, and the areas of the exit holograms 340 and the reflecting surfaces 31 when viewed in the normal direction Dn are set similarly to the widths, the heights, and the areas of the prisms 40 and the reflecting surfaces 31 in the first embodiment.

The optical member 10 of the eighth embodiment is configured as described above. Also by the optical member 10 according to the eighth embodiment, the scene in the blind area due to the pillar 5 can be visually recognized by the occupant of the vehicle 1 by the following mechanism.

Figure 24:
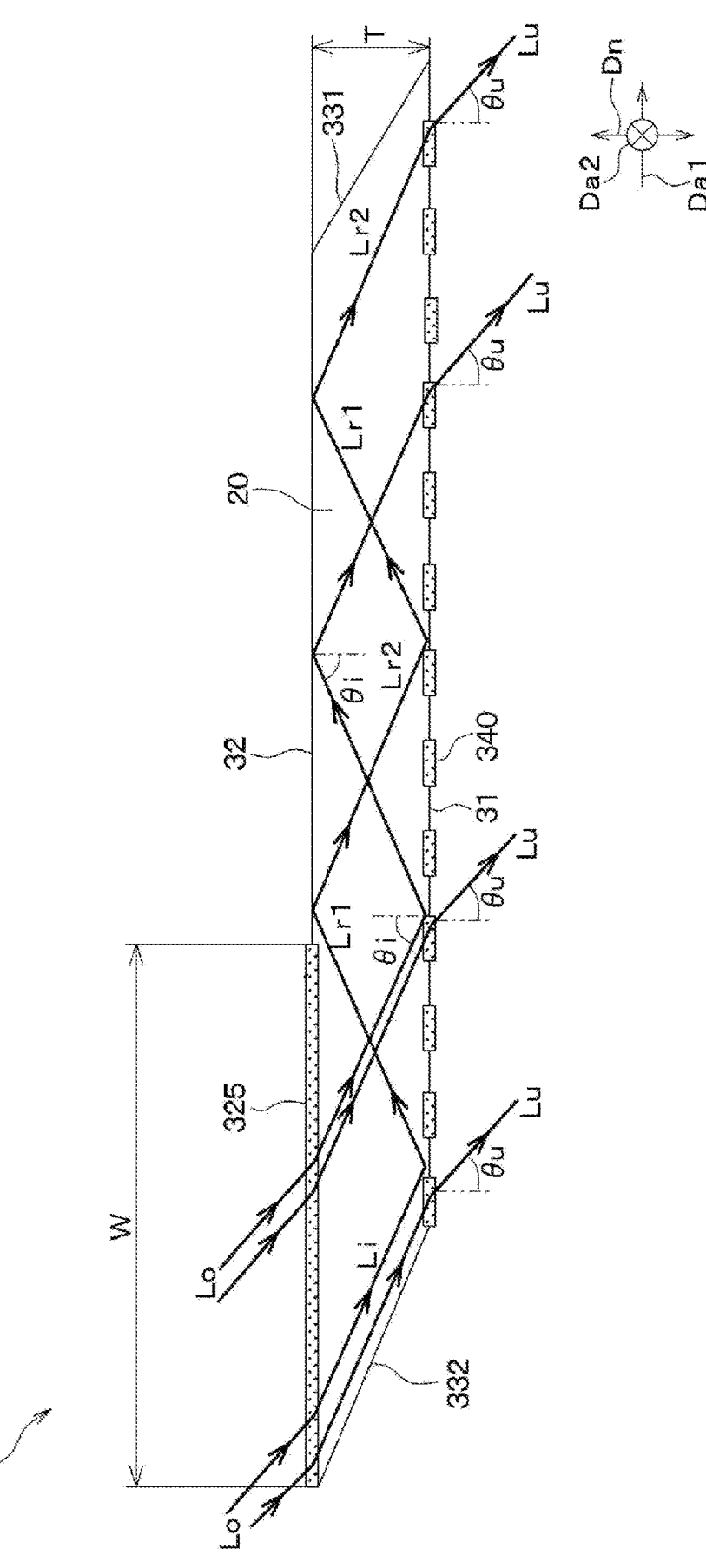
FIG. 24 is a schematic cross-sectional view showing a state in which an outside light is incident on an incident hologram of the optical member according to the eighth embodiment.

For example, as shown in FIG. 24, when an outside light Lo is incident on the incident hologram 325 at the incident angle θo, the light incident on the incident hologram 325 is refracted due to interference by the incident hologram 325. Thus, the light incident on the incident hologram 325 becomes an incident light Li. The incident angle θo is the angle formed between the traveling direction of the outside light Lo and the normal direction Dn as described above.

A part of the incident light Li travels toward the reflecting surface 31 at the incident angle θi and reaches the reflecting surface 31. The reached incident light Li is totally reflected by the reflecting surface 31 and becomes a first reflected light Lr1. The first reflected light Lr1 travels toward the smooth surface 32 at the incident angle θi and reaches the smooth surface 32. The reached first reflected light Lr1 is totally reflected by the smooth surface 32 and becomes a second reflected light Lr2. The second reflected light Lr2 travels toward the exit hologram 340 and reaches the exit hologram 340. The reached second reflected light Lr2 is interfered by the exit hologram 340, and is emitted as an exit light Lu from the exit hologram 340 at an exit angle θu that is the same as the incident angle θo. The exit light Lu travels toward and reaches the occupant of the vehicle 1, so that the scene in the blind area due to the pillar 5 is visually recognized by the occupant. The incident angle θi is the angle formed between the traveling direction of the incident light Li and the normal direction Dn as described above. The exit angle θu is the angle formed by the traveling direction of the exit light Lu and the normal direction Dn as described above. In addition, Asi<π/2−θi is satisfied in a manner similar to the first embodiment. The sizes and the directions of the minute unevenness of the incident hologram 325 and the exit holograms 340 are adjusted so that the exit angle θu becomes the same as the incident angle θi. In addition, the amplitude and the phase of the electric field of the light recorded in the incident hologram 325 and the exit holograms 340 are adjusted.

In addition, a part of the incident light Li travels toward the exit hologram 340 and reaches the exit hologram 340. The reached incident light Li is interfered by the exit hologram 340, and is emitted as an exit light Lu from the exit hologram 340 at an exit angle θu that is the same as the incident angle θo. The exit light Lu travels toward and reaches the occupant of the vehicle 1, so that the scene in the blind area due to the pillar 5 is visually recognized by the occupant.

As described above, also by the optical member 10 according to the eighth embodiment, the scene in the blind area due to the pillar 5 can be visually recognized by the occupant of the vehicle 1. The eighth embodiment achieves effects similar to the effects achieved by the seventh embodiment.

Other Embodiments

The present disclosure is not limited to the above-described embodiments, and the above-described embodiments can be appropriately modified. In each of the above-described embodiments, individual elements or features of a particular embodiment are not necessarily essential unless it is specifically stated that the elements or the features are essential, or unless the elements or the features are obviously essential in principle.

In the above-described embodiments, each of the prisms 40 has the triangular prism shape. However, the shape of the prisms 40 is not limited to the triangular prism shape, and may also be, for example, a trapezoidal prism shape.

In the above-described embodiments, each of the light shielding layers 60, the inclined surface light-shielding layer 75, and the incident light-shielding layer 90 is formed of the light absorption film. However, the material of each of the light shielding layers 60, the inclined surface light-shielding layer 75, and the incident light-shielding layer 90 is not limited to the light absorption film, and may also be a light diffusion member or a retroreflecting member.

In the above-described embodiments, the smooth surface 32 is parallel to the reflecting surfaces 31. However, the smooth surface 32 may also be configured so as not to be parallel to the reflecting surfaces 31 in accordance with the distance from the optical member 10 to the viewer.

The above-described embodiments may be combined as appropriate.

What is claimed is:

1. An optical member comprising
a light guide body including:
an incident surface on which a light from a blind area is incident;

a plurality of reflecting surfaces configured to reflect the light that is guided from the incident surface;
a smooth surface configured to reflect the light that is reflected by the plurality of reflecting surfaces; and
a plurality of prisms protruding from the plurality of reflecting surfaces in a normal direction of the plurality of reflecting surfaces and configured to emit the light that is guided from the incident surface and the light that is reflected by the smooth surface to an outside of the light guide body, wherein
the plurality of prisms is arranged at an interval in a first direction that intersects the normal direction and is arranged at an interval in a second direction that intersects the normal direction and the second direction,
each of the plurality of reflecting surfaces is positioned between two of the plurality of prisms adjacent to each other such that the plurality of reflecting surfaces is arranged at an interval in the first direction and is arranged at an interval in the second direction,
the light guide body has a first region close to the incident surface and a second region located opposite to the incident surface across the first region,
the plurality of prisms includes a plurality of first prisms arranged in the first region and a plurality of second prisms arranged in the second region,
the plurality of reflecting surfaces includes a plurality of first reflecting surfaces arranged in the first region and a plurality of second reflecting surfaces arranged in the second region,
a ratio of a total area of the plurality of first reflecting surfaces when viewed in the normal direction to a total area of the plurality of first prisms and the plurality of first reflecting surfaces when viewed in the normal direction is defined as a first reflection area ratio,
a ratio of a total area of the plurality of second reflecting surfaces when viewed in the normal direction to a total area of the plurality of second prisms and the plurality of second reflecting surfaces when viewed in the normal direction is defined as a second reflection area ratio, and
the second reflection area ratio is smaller than the first reflection area ratio.

2. The optical member according to claim 1, further comprising
a plurality of light shielding portions configured to block a light that is directed toward the plurality of prisms from the outside of the light guide body, wherein
the plurality of light shielding portions is arranged at an interval in the first direction and is arranged at an interval in the second direction.

3. The optical member according to claim 1, wherein
each of the plurality of prisms is configured to emit the light that is guided from the incident surface and the light that is reflected by the smooth surface to the outside of the light guide body in the normal direction and the first direction, and
in the second direction, a sum of a length of each of the plurality of prisms and a length of each of the plurality of reflecting surfaces that is positioned between two of the plurality of prisms adjacent to each other in the second direction is less than or equal to 2 mm.

4. The optical member according to claim 1, wherein
the incident surface is connected with the smooth surface and at least one of the plurality of reflecting surfaces while intersecting each other, the light guide body further includes a connecting surface located opposite to the incident surface and connected with the smooth surface and at least one of the plurality of reflecting surfaces while intersecting each other, and one of the plurality of prisms that is rearmost when counted in a direction from the incident surface to the connecting surface is connected with the connecting surface while intersecting each other.

5. The optical member according to claim 1, wherein the light guide body is divided into t regions such that the light guide body has the first region, the second region, . . . , and a t-th region in order from a side close to the incident surface in the first direction, where t is an integer of 2 or more, the plurality of prisms includes a plurality of t-th prisms arranged in the t-th region, the plurality of reflecting surfaces includes a plurality of t-th reflecting surfaces arranged in the t-th regions, a ratio of a total area of the plurality of t-th reflecting surfaces when viewed in the normal direction to a total area of the plurality of t-th prisms and the plurality of t-th reflecting surfaces when viewed in the normal direction is defined as a t-th reflection area ratio, and the t-th reflection area ratio is zero.

6. An optical member comprising a light guide body including:

a first hologram configured to interfere and refract a light that is incident from a blind area;

a plurality of reflecting surfaces configured to reflect the light that is refracted by the first hologram;

a smooth surface configured to reflect the light that is reflected by the plurality of reflecting surfaces; and a plurality of second holograms disposed on the plurality of reflecting surfaces and configured to interfere and refract the light that is refracted by the first hologram and the light that is reflected by the smooth surface to emit the lights to an outside of the light guide body, wherein the plurality of second holograms is arranged at an interval in a first direction that intersects a normal direction of the plurality of reflecting surfaces and is arranged at an interval in a second direction that intersects the normal direction and the first direction, and each of the plurality of reflecting surfaces is positioned between two of the plurality of second holograms adjacent to each other such that the plurality of reflecting surfaces is arranged at an interval in the first direction and is arranged at an interval in the second direction.

7. An optical member comprising:

a light guide body including:

an incident surface on which a light from a blind area is incident;

a plurality of reflecting surfaces configured to reflect the light that is guided from the incident surface;

a smooth surface configured to reflect the light that is reflected by the plurality of reflecting surfaces; and a plurality of prisms protruding from the plurality of reflecting surfaces in a normal direction of the plurality of reflecting surfaces and configured to emit the light that is guided from the incident surface and the light that is reflected by the smooth surface to an outside of the light guide body; and a plurality of light shielding portions configured to block a light that is directed toward the plurality of prisms from the outside of the light guide body, wherein the plurality of prisms is arranged at an interval in a first direction that intersects the normal direction and is arranged at an interval in a second direction that intersects the normal direction and the second direction, each of the plurality of reflecting surfaces is positioned between two of the plurality of prisms adjacent to each other such that the plurality of reflecting surfaces is arranged at an interval in the first direction and is arranged at an interval in the second direction, the plurality of light shielding portions is arranged at an interval in the first direction and is arranged at an interval in the second direction.

* * * * *